United States Patent [19]

Ichige et al.

[11] Patent Number: 5,255,238
[45] Date of Patent: Oct. 19, 1993

[54] FIRST-IN FIRST-OUT SEMICONDUCTOR MEMORY DEVICE

[75] Inventors: Hiroshi Ichige; Junichi Kono, both of Kodaira; Toshio Okochi, Ohme, all of Japan

[73] Assignee: Hitachi, Ltd., Tokyo, Japan

[21] Appl. No.: 794,824

[22] Filed: Nov. 18, 1991

Related U.S. Application Data

[63] Continuation of Ser. No. 403,667, Sep. 6, 1989, abandoned.

[30] Foreign Application Priority Data

Sep. 8, 1988 [JP] Japan .................................. 63-224931
Sep. 30, 1988 [JP] Japan .................................. 63-244002
Jun. 12, 1989 [JP] Japan .................................. 1-149241

[51] Int. Cl.$^5$ ............................................. G11C 7/00
[52] U.S. Cl. .............................. 365/220; 365/189.07; 365/221; 365/236; 365/238.5
[58] Field of Search .................... 365/230.5, 220, 221, 365/189.07, 236

[56] References Cited

U.S. PATENT DOCUMENTS

| | | | |
|---|---|---|---|
| 4,651,308 | 3/1987 | Sato | 365/238.5 |
| 4,819,201 | 4/1989 | Thomas et al. | 365/221 |
| 4,833,651 | 5/1989 | Seltzer et al. | 365/221 |
| 4,864,543 | 9/1989 | Ward et al. | 365/221 |
| 4,873,660 | 10/1989 | Lefebeve et al. | 365/221 |
| 4,873,667 | 10/1989 | Geadah et al. | 365/221 |
| 4,888,739 | 12/1989 | Frederick et al. | 365/221 |
| 4,897,816 | 1/1990 | Kogan | 365/221 |
| 4,922,437 | 5/1990 | Sakata et al. | 365/221 |

Primary Examiner—Joseph E. Clawson, Jr.
Attorney, Agent, or Firm—Fay, Sharpe, Beall, Fagan, Minnich & McKee

[57] ABSTRACT

The number of bits of data items read in parallel fashion and the number of bits of data items written in parallel fashion are related to be at least a whole number multiple of 2, thereby to achieve enhancement in the efficiency of data transfer between a semiconductor memory device and the exterior thereof.

Further, in a semiconductor memory device of FIFO type, the number of stored data items is calculated using the values of a write counter and a read counter, thereby to achieve the accurate acquisition of the number of stored data items even when the operations of reading and writing data items coincide.

In a semiconductor memory device having a built-in address counter, the value of the address counter or an external address signal is selected on the basis of an external instruction in order to address a memory cell, thereby to achieve facilitation of random accesses to memory cells and also the clearing of the data items of any desired memory cells.

7 Claims, 17 Drawing Sheets

FIG. 10

| R/W | WRITE COUNTER 20 | | READ COUNTER 22 | | NUMBER OF STORED DATA (BYTE NUMBER) |
|---|---|---|---|---|---|
| | RSTSw | RCOUNTw | RSTSr | RCOUNTr | |
| W | 0 | 0 0 | 0 | 0 0 | 0 |
| W | 0 | 0 1 | 0 | 0 0 | 1 |
| W | 0 | 1 0 | 0 | 0 0 | 2 |
| W | 0 | 1 1 | 0 | 0 0 | 3 |
| R | 1 | 0 0 | 0 | 0 0 | 4 |
| R | 1 | 0 0 | 0 | 0 1 | 3 |
| R | 1 | 0 0 | 0 | 1 0 | 2 |
| R | 1 | 0 0 | 0 | 1 1 | 1 |
| W | 1 | 0 0 | 1 | 0 0 | 0 |
| W | 1 | 0 1 | 1 | 0 0 | 1 |
| W | 1 | 1 0 | 1 | 0 0 | 2 |
| W | 1 | 1 1 | 1 | 0 0 | 3 |
| R | 0 | 0 0 | 1 | 0 0 | 4 |
| R | 0 | 0 0 | 1 | 0 1 | 3 |
| R | 0 | 0 0 | 1 | 1 0 | 2 |
| W | 0 | 0 0 | 1 | 1 1 | 1 |
| W | 0 | 0 1 | 1 | 1 1 | 2 |
| W | 0 | 1 0 | 1 | 1 1 | 3 |
| W | 0 | 1 1 | 1 | 1 1 | 4 |
| R | 0 | 1 1 | 0 | 0 0 | 3 |
| W | 1 | 0 0 | 0 | 0 0 | 4 |

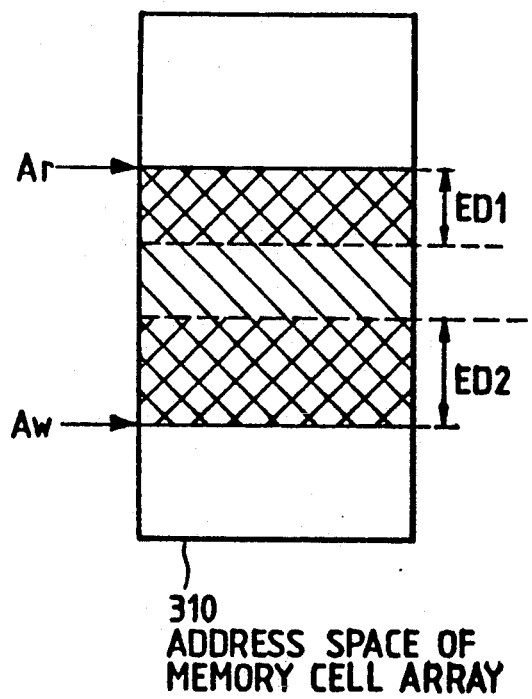 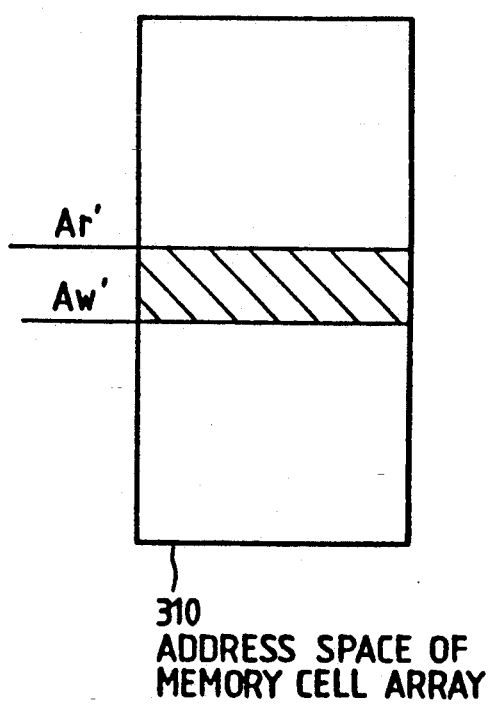
FIG. 15A
FIG. 15B
310
ADDRESS SPACE OF
MEMORY CELL ARRAY
310
ADDRESS SPACE OF
MEMORY CELL ARRAY

FIRST-IN FIRST-OUT SEMICONDUCTOR MEMORY DEVICE

This is a continuation of copending application Ser. No. 07/403,667 filed on Sep. 6, 1989 now abandoned.

BACKGROUND OF THE INVENTION

The present invention relates to a semiconductor memory device which includes address generation means therein, and more particularly to a FIFO memory (first-in first-out memory) which temporarily stores data in first-in first-out fashion. It consists of techniques which are effective when applied to, for example, a communication controlling LSI and a communication control system.

In the case where data items are transferred among a plurality of devices or function modules which have different rates of data processing or data transferring, FIFO memories or the like can be utilized as buffer memories for the purpose of absorbing such differences in the capabilities or the rates. In, for example, a communication controlling LSI, a transmitting FIFO memory and a receiving FIFO memory are arranged between a line control unit, which transmits and receives data to and from communication lines, and a bus interface unit which is connected with host equipment. The receiving FIFO memory stores the received data items of the line control unit in succession, and the host equipment reads out the stored data items through the bus interface unit in succession so as to subject them to data transfer or data processing. The transmitting FIFO memory stores transmission data items supplied from the host equipment thereto through the bus interface unit, in succession, and the line control unit reads out the stored data items in succession so as to subject them to transmission.

Regarding the receiving FIFO memory or the transmitting FIFO memory, it is necessary to control the number of data items to-be-stored at will and, further, to inform the host equipment of the number of stored data items in real time. The number of data items should be controlled to reduce the overhead time for the data transfer and prevent the overrun of reception data items. A technique for counting the number of stored data items of the FIFO memory employs a dedicated counter which is incremented each time the FIFO memory is instructed to perform a write operation and which is decremented each time it is instructed to perform a read operation, as disclosed in the official gazette of Japanese Patent Application Laid-open No. 225050/1987.

Further, frames or characters in the transmission/reception of data are usually transferred with 8 bits as the minimum unit. The transmitting FIFO memory or receiving FIFO memory in the prior art is therefore adapted to transfer data in 8-bit units between itself and the line control unit. Accordingly, the transmitting or receiving FIFO memory and the bus interface unit have been connected by only one bus of 8 bits. An example of literature containing a bus structure of the FIFO memory of this type is Intel Inc., U.S.: 82586 (LAN Components Users Manual 2. 13, issued in March 1984).

However, when a single dedicated counter is incremented for every writing operation and decremented for every reading operation, a problem arises if the writing and the reading simultaneously occur. This simultaneous occurrence of reading and writing makes it difficult to obtain an accurate count of the number of stored data items.

Further, the inventor has conducted a study concerning the technique for requesting the host equipment to transfer transmission data on the basis of 1) the number of stored transmission data items which have been transferred from the host equipment to the transmitting FIFO memory and 2) the number of stored transmissions data items which remain in this FIFO memory. The prior art only requests data transfer in accordance with the remaining number of the stored data items, and not in accordance with the number of the data items which are transferred from the host equipment to the transmitting FIFO memory. In the case where a large number of transmitting FIFO memories are disposed in correspondence with the respective channels of the line control unit which supports a large number of channels, many of the transmitting FIFO memories request the host equipment to transfer data in some operations. The prior art does not allow the negate conditions of the transfer requests for the transmitting FIFO memories to be set at will. Thus, the bus might be occupied due to the data transfers to the transmitting FIFO memories, and any other necessary processing by the host equipment might be hampered.

In addition, in the case where the bus interface unit in the communication control unit can be connected with the host equipment through a bus having a bit configuration of 16 bits, for example, data items are transferred in 16-bit units between the host equipment and the bus interface unit. When the transmitting FIFO memory or receiving FIFO memory and the bus interface unit are connected by an 8-bit bus as in the prior art, data items which exceed 8-bits must be divided. Each portion must then be transferred between the transmitting or receiving FIFO memory and the bus interface unit. This lowers the efficiency of the data transfer between the FIFO memory and the host equipment.

Meanwhile, the FIFO memory comprises address counters, such as a read counter and a write counter, in order to store data in first-in first-out fashion. The addresses of accesses to memory cell arrays are designated by the read and write counters. The values of the read and write counters are held in agreement under the empty state while no data item is stored in the memory cell arrays. The value of the write counter is incremented each time a data writing operation is instructed, while the value of the read counter is incremented each time a data reading operation is instructed. An example of literature containing such a FIFO memory is "NIKKEI ELECTRONICS" issued by Nikkei McGraw-Hill Kabushiki-Kaisha, No. 423 (dated Jun. 15, 1987), pp. 181–188. In the prior-art FIFO memory, however, the sequences of reading and writing data items are uniquely determined by the built-in address counters, such as read and write counters. Thus, random accesses to memory cells, which might be required, cannot be accomplished. Consequently, the prior art encompasses the following drawbacks: 1) when a data item that needs to be checked is not the first stored data item in the FIFO memory, all data items stored ahead of the desired data item must be output in succession; 2) in order to clear unnecessary data items which have appeared in the FIFO memory due to an error or the like in a system operation, all the unnecessary data items must be read out in succession in order to update the value of the read counter; and, 3) time is expended on the data checking operation or the data clearing operation. Thus, the real time processing of data is impeded.

SUMMARY OF THE INVENTION

A FIFO memory is constructed for communication with data storage devices or function modules, by connecting the input signal lines and output signal lines of the devices and modules to input and output ports of the memory to transmit data items comprised of variable bit lengths to respective bit cells included in a bit cell array of the memory. The memory has a plurality of ports to accommodate communication with a plurality of devices or modules. The number of parallel read bits and the number of parallel write bits of the various data items preferably has a relationship whereby one member of parallel read or write bits can be a whole number multiple of the other. Further, the whole number multiple is at least two. When data items with a predetermined plurality of bits set as one unit are to be stored in first-in, first-out fashion, one port of the FIFO memory is permitted to collectively transfer the unit data whose bit lengths can be many times larger than the bit lengths being stored or read to or from the other port. Enhancement in the efficiency of data transfer with the FIFO memory is achieved because data items of different bit lengths can be transferred between the devices and modules. By way of example, in the case where the FIFO memory is interposed between the line control unit and the bus interface unit of a communication control unit, the FIFO transfers data with the line control unit in an octet unit, while it transfers data with the bus interface unit in a whole number multiple (sixteen) of an octet unit.

A selection control circuit controls the relationship between the number of bits read in parallel fashion and the number of bits written in parallel fashion. The control circuit selects and controls the number of respective bits so that they are equal to each other or so that one is a whole number multiple of at least 2 of the other. Thereby, the bus connection configuration between the FIFO memory and the circuit block for data transfer has improved versatility. Further, bus swaps can be readily effected without utilizing any external circuit, and the handling of the FIFO memory is facilitated.

Arithmetic means for acquiring the number of stored data items of a receiving FIFO memory includes comparison means for substantially comparing the value of a write counter and that of a read counter. The number of stored data items is calculated on the basis of the value of the write counter, the value of the read counter and the number of storage stages of unit storage areas in accordance with the compared result of the comparison means. The read counter and the write counter operate separately and convey the respective count values to the arithmetic means. The arithmetic means processes the values supplied from both counters separately. Therefore, even when reading and writing have simultaneously occurred, accurate acquisition of the number of stored data items is achieved.

The value of the read counter and that of the write counter are compared by endowing the counters statuses. These statuses are inverted each time the count values are returned to initial values. The agreement/disagreement of the statuses of both the counters is determined by the comparison means. In calculating and acquiring the number of stored data items, the facilitation of magnitude discrimination is achieved since the value of the write counter has been returned to the initial value after one circulation.

When the number of storage stages of the FIFO memory is comparatively small, the accurate acquisition of the number of stored data items is achieved 1) by providing flags which are held in one-to-one correspondence with the unit storage areas; and, 2) by providing control means for controlling a set status through the flag corresponding to the position indicated by the write counter, a reset status through the flag corresponding to the position indicated by the read counter, and a logic gate array for obtaining the number of stored data items of the bit cell array from the statuses of the flags.

The number of stored data items acquired can be transmitted to the exterior as is. However, in order to freely set the number of data items to be stored in the interior a "transfer ready" signal may be generated. The "transfer ready" signal is generated so as to determine the assert timing based on the result of the comparison between the set value of a register capable of setting the assert condition of the transfer ready signal at will and the number of stored data items acquired in the interior.

Also, in the case where the period of bus occupation by the data transfer to the FIFO memory becomes inconveniently long, the negate condition of the transfer ready signal may be freely controlled on the basis of the comparison of the number of stored data items with the set value of a register capable of setting the negate condition of the transfer ready signal at will.

Accordingly, the control register capable of setting the assert condition of the transfer ready signal at will and the control register capable of setting the negate condition of the transfer ready signal at will are provided. The assert timing and negate timing of the transfer ready signal are determined on the basis of the results of the comparisons of the set values of these registers with the number of stored data items acquired in the interior. The number of storage stages of the FIFO memory is variable and can be controlled.

Thus, the number of stored data items of the FIFO memory can be made relatively small for a light load of equipment which processes the data of the FIFO memory. The number of stored data items can be made large for the heavy load of equipment. Consequently, the flexibility of system operations can be enhanced. Moreover, in a high speed operation etc., the frequency of data transfer requests is lowered. In other words, overhead time for starting a data transfer control is decreased, whereby the throughput of the system can be enhanced.

Meanwhile, in a semiconductor memory device wherein the sequence of reading or writing data items is prescribed by a built-in address counter, selection means is provided which selects either an output address signal from the address counter or an address signal supplied externally. The address counter is controlled so as to inhibit the update operation when an external address signal is adopted as an access address signal by the selection means. While an address designated by the address counter is maintained as is, required data can be obtained from any desired address other than the designated address. Thus, random accesses become possible notwithstanding the fact that this is a semiconductor memory device wherein the sequences of reading and writing data items are prescribed by the built-in address counters.

By making it possible to externally rewrite the value of the built-in address counter which prescribes the sequence of reading or writing data items, the address counter can be externally rewritten when unnecessary data has arisen amidst the stored data items. Therefore, the facilitation of clearing the unnecessary data is achieved. In the semiconductor memory device constructed, an arrangement which makes it possible to read the value of the address counter to the exterior through an external data input/output terminal is desirable. The status of the address counter needs to be made available to the exterior 1) when the value of this address counter needs to be rewritten for random access; or, 2) when unnecessary data needs to be cleared from the FIFO.

An object of the present invention is to provide a semiconductor memory device of FIFO form which can raise the efficiency of data transfer within a data processing system.

Another object of the present invention is to provide a semiconductor memory device of FIFO form which can accurately determine the number of stored data items.

Still another object of the present invention is to provide a semiconductor memory device of FIFO form which can set the number of data items to-be-stored at will.

Yet another object of the present invention is to provide a semiconductor memory device in which random accesses can be effected even when the sequences of reading and writing data are prescribed by built-in address counters.

A further object of the present invention is to provide a semiconductor memory device in which the clearing of data items can be easily effected even when the sequences of reading and writing data are prescribed by built-in address counters.

The aforementioned and other objects and novel features of the present invention will become apparent from the description of this specification when read in conjunction with the accompanying drawings.

BRIEF DESCRIPTION OF THE DRAWINGS

FIG. 10 is a table showing the relations among the count values of a write counter and a read counter and the number of stored data items in the transmitting FIFO memory;

FIGS. 15A and 15B are diagrams for explaining an example of clearing in the FIFO memory;

DESCRIPTION OF THE PREFERRED EMBODIMENTS

Communication Control Unit 1

Figure 1A:
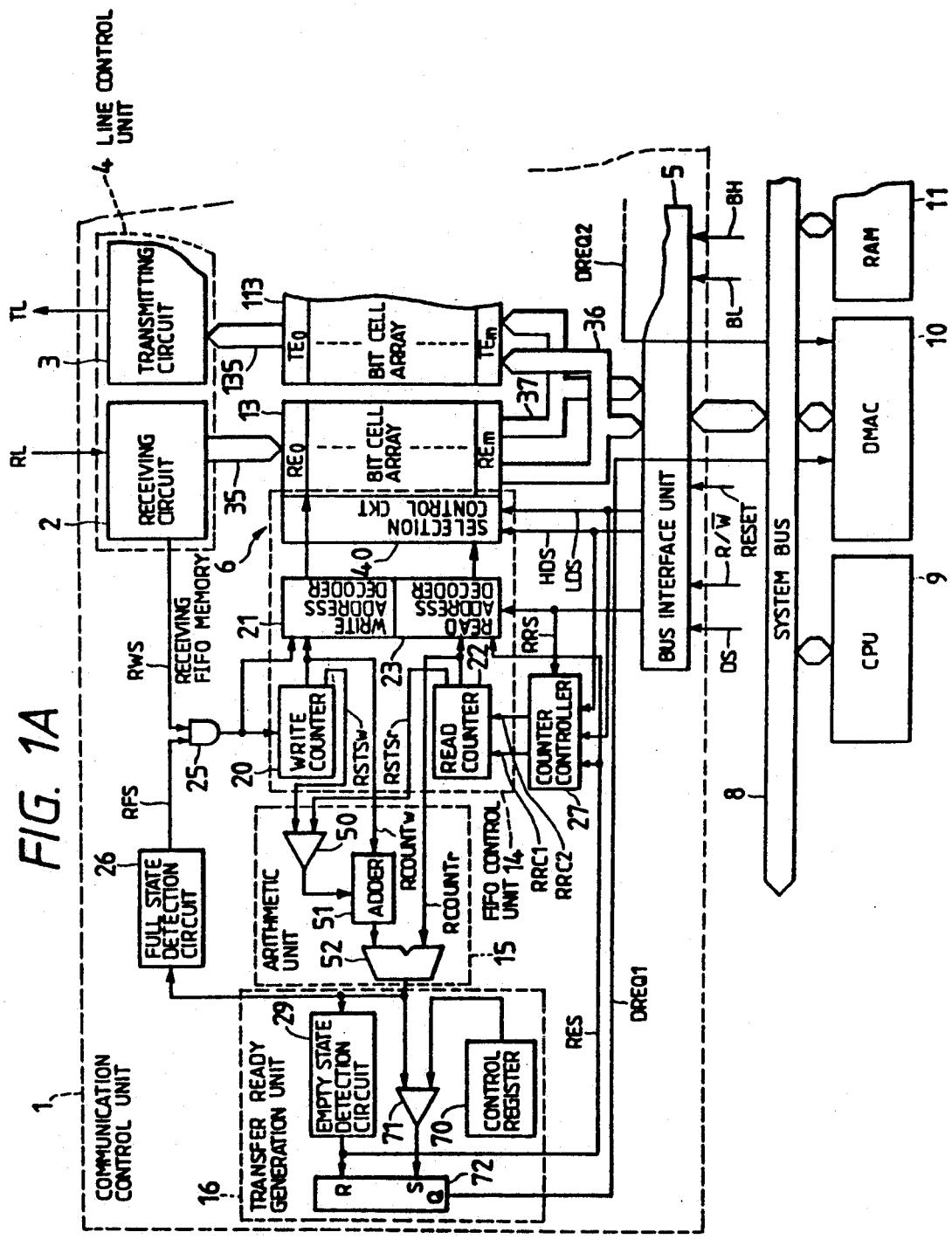
FIG. 1A is a block diagram of an embodiment of the reception side of a communication control unit which includes a FIFO memory according to the present invention.
Figure 1B:
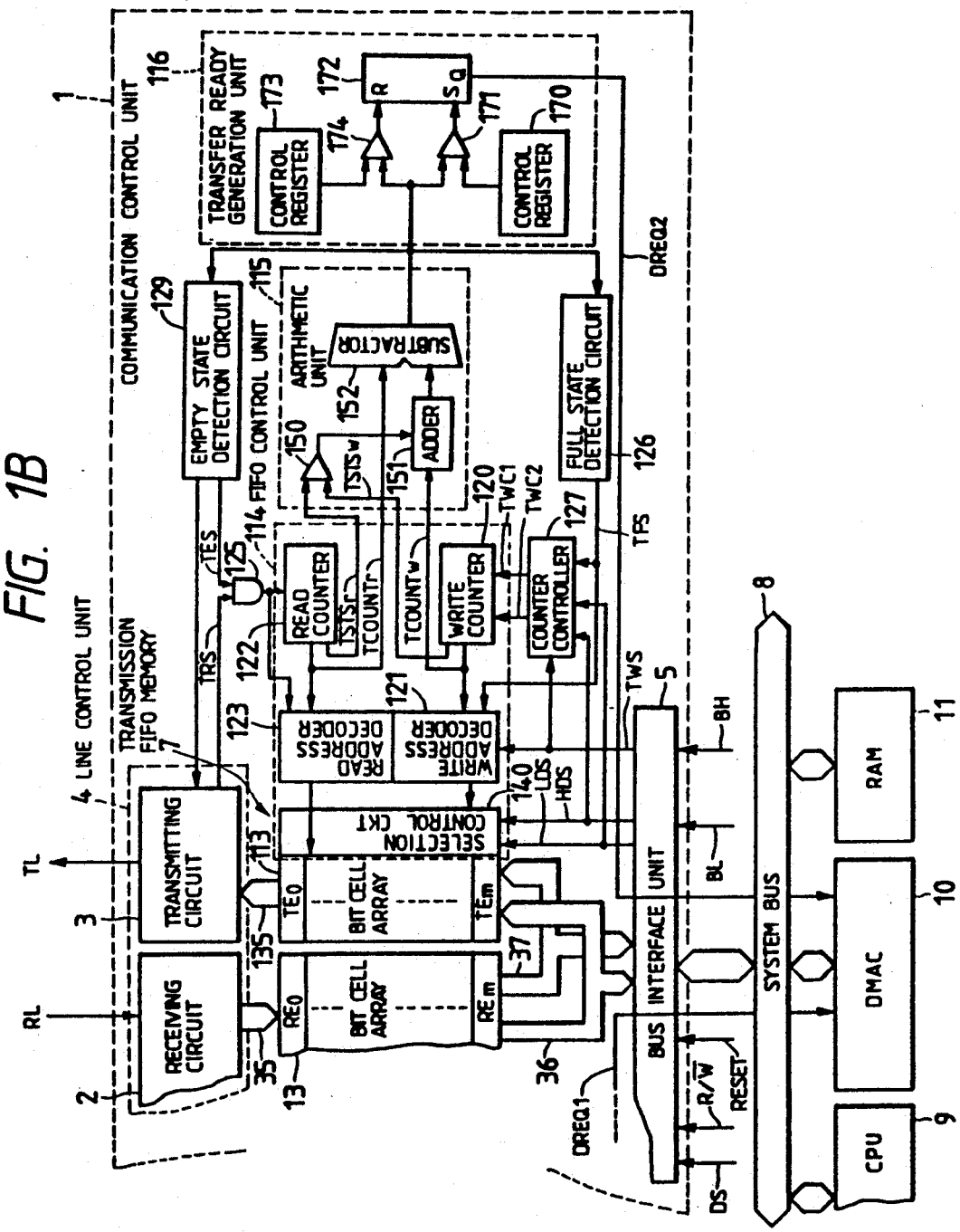
FIG. 1B is a block diagram of an embodiment of the transmission side of the communication control unit which includes a FIFO memory according to the present invention.

Communication control unit 1 is an embodiment of the present invention which has the construction of its reception side shown in FIG. 1A, and has the construction of its transmission side shown in FIG. 1B. Although not especially restricted, the communication control unit 1 is formed on a single semiconductor substrate such as silicon. It is produced using techniques known in the semiconductor integrated circuits industry.

Although no special restriction is intended, the communication control unit 1 has a line control unit 4 which includes 1) a receiving circuit 2 by which reception data items transmitted through a receiving line RL in bit-serial fashion are received and are subjected to serial/parallel conversion in octet units (8-bit unit); and, 2) a transmitting circuit 3 by which parallel data items to be transmitted are subjected to parallel/serial conversion in octet units and are delivered to a transmitting line TL. Also, it has a bus interface unit 5 interfaced with host equipment. A receiving FIFO memory 6 is arranged between the bus interface unit 5 and the receiving circuit 2, while a transmitting FIFO memory 7 is interposed between the bus interface unit 5 and the transmitting circuit 3. Receiving FIFO memory 6 temporarily stores converted parallel data in octet units. Transmitting FIFO memory 7 temporarily stores data items, which are to be transmitted, in octet units. Additionally, the size of the serial/parallel conversion or the parallel/serial conversion in the line control unit 4 is not restricted to 8 bits. It must, though, be of constant size and finite length. Further, the end of the train of serial data items should correspond exactly to the unit number of bits. If not, some superfluous data items will be involved. The first and last of the serial data items are recognized by the receiving circuit 2 in accordance with a predetermined procedure. Likewise, the transmitting circuit 3 is endowed with information for making it possible to recognize the first and last bits of the transmission data items. Such control procedures are determined according to a protocol which the communication control unit 1 supports, and the concrete contents thereof are not restricted.

Although not especially restricted, the bus interface unit 5 is coupled through a system bus 8 to such host devices as a CPU (central processing unit) 9 which governs the control of the whole system, a DMAC (direct memory access controller) 10 which can perform the control of the block transfer of data in a single addressing mode or a dual mode, and a RAM (random access memory) 11 which is utilized as a storage area for data, the working area of the CPU 9, etc. The system bus includes a 16-bit data bus, an address bus, etc. The bus interface unit 5 is supplied with bus control signals which are delivered from the bus master modules of the CPU 9, the DMAC 10, etc. Bus control signals include a read/write signal R/W which indicates the direction of data transfer, a data strobe signal DS which indicates that data on the data bus included in the system bus 8 is valid, a bus high signal BH which indicates that the higher 8 bits of the 16-bit data bus are valid, and a bus low signal BL which indicates that the lower 8 bits of the 16-bit data bus are valid.

When the receiving circuit 2 receives the data, the received data items are written into the receiving FIFO memory 6 in regular sequence. When the number of data items stored in the receiving FIFO memory 6 reaches a predetermined number, the receiving FIFO memory 6 asserts a "transfer ready" signal instructing the host device side to perform read access to this receiving FIFO memory 6. For example, it asserts a DMA (direct memory access) transfer request signal DREQ1 in the predetermined channel of the DMAC 10. Thus, the DMAC 10 operates to transfer the stored data items of the receiving FIFO memory 6 to the RAM 11 in the single addressing mode. The data items transferred to the RAM 11 might be used for predetermined protocol processing by the CPU 9.

The transmitting circuit 3 transmits the data items stored in the transmitting FIFO memory 7 successively in accordance with a predetermined procedure. Meanwhile, when the number of data items remaining in the transmitting FIFO memory 7 decreases, the transmitting FIFO memory 7 asserts a "transfer ready" signal to instruct the host device side to write data to-be-transmitted. For example, it asserts a DMA transfer request signal DREQ2 in the predetermined channel of the DMAC 10. Thus, the DMAC 10 operates to transfer the data items to-be-transmitted stored in the RAM 11 to the transmitting FIFO memory 7 in the single addressing mode.

Although not especially restricted, various control registers built in the communication control unit 1 can be directly accessed by the CPU 9. More specifically, when an address signal is supplied from the CPU 9 to the bus interface unit 5, a register selection circuit which decodes the address signal selects a register corresponding to the pertinent address, and the CPU 9 subjects the register thus selected to the initialization of control data.

Receiving FIFO Memory 6

Although not especially restricted, the receiving FIFO memory 6 includes 1) a bit cell array 13 which includes a plurality of unit storage areas $RE_0$–$RE_m$ each being configured of bit cells of 8 bits; 2) a FIFO control unit 14 which performs the selection control of the unit storage areas, etc.; 3) an arithmetic unit 15 which calculates the number of data items stored in the bit cell array 13; and, 4) a transfer ready generation unit 16 which generates the DMA transfer request signal DREQ1 by the use of the number of stored data items acquired by the arithmetic unit 15, and so on.

Figure 2:
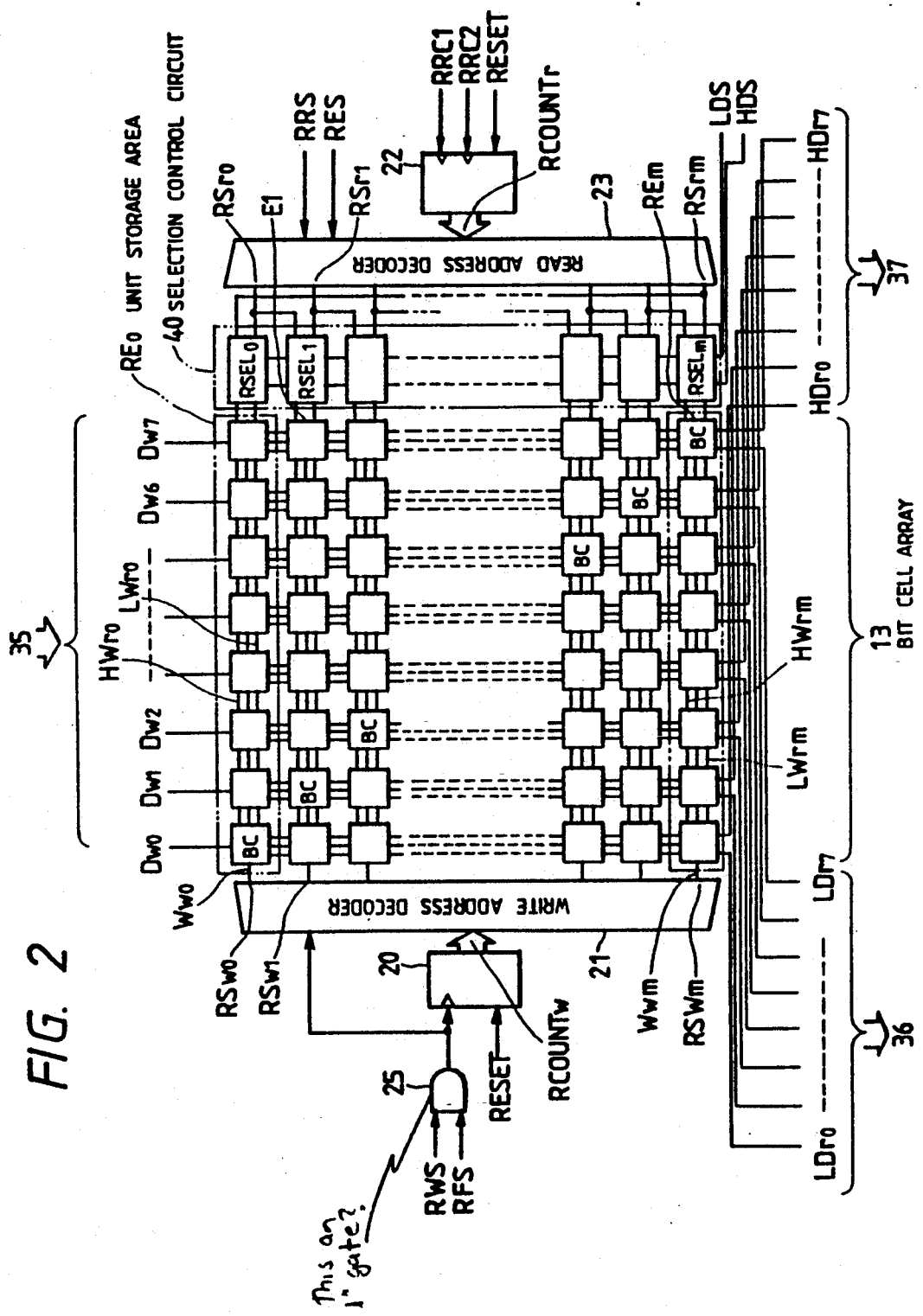
FIG. 2 is a block diagram showing a detailed example for selecting the unit storage area of the receiving FIFO memory.

Although no special restriction is intended, the bit cell array 13 has the bit cells BC arranged in the shape of a matrix of n rows and 8 columns as shown in FIG. 2. The 8 bit cells of each row constitute one of the 8-bit unit storage areas $RE_0$–$RE_m$.

A unit storage area of BC array 13 into which data is being written is designated by a write counter 20. The count data $RCOUNT_w$ of the write counter 20 is decoded by a write address decoder 21. Thus, a single unit storage area is selected. On the other hand, when data is being read from a unit storage area the unit storage area is designated by a read counter 22. The count data $RCOUNT_r$ of the read counter 22 is decoded by a read address decoder 23. Thus, the predetermined unit storage area is selected. In the initial status of the receiving FIFO memory 6, the values of the write counter 20 and read counter 22 are initialized to zero.

Receiving FIFO Memory 6 . . . write Counter 20

The write counter 20 indicates which position of the head unit storage areas is writable. This information is output to the write address decoder 21. When the received data items are delivered from the receiving circuit 2 to the bit cell array 13, the receiving circuit 2 responsively asserts a strobe signal RWS. When the strobe signal RWS passes through a gate 25, the write address decoder 21 first decodes the value of the write counter 20 in synchronism with the assert timing of the strobe signal RWS and selects the unit storage area into which the received data items are written. The write counter 20 is subsequently incremented in synchronism with the negate timing of the strobe signal RWS. Thus, the write counter 20 holds the next write position.

Incidentally, in the full state, where all the unit storage areas $RE_0$–$RE_m$ are occupied, new received data cannot be written into the bit cell array 13. In order to prevent writing in the full state a full state detection circuit 26 is provided. Full state detection circuit 26 receives the number of stored data items calculated by the arithmetic unit 15 to determine if the bit cell array 13 is in the full state. The detection result signal RFS of the circuit 26 is applied to the gate 25. Thus, in the full state, the strobe signal RWS is not transmitted to the write counter 20 and the write address decoder 21.

Receiving FIFO memory 6 . . . Read Counter 22

The read counter 22 indicates which position of the head unit storage area is readable. This information is output to the read address decoder 23. When the read operation of the receiving FIFO memory 6 is initiated by the data strobe signal DS, read/write signal R/W, bus low signal BL and bus high signal BH all of which are output from the host devices, the bus interface unit 5 asserts a strobe signal RRS. RRS is asserted in synchronism with data strobe signal DS and read/write signal R/W. DS and R/W are preferably asserted to a high level. The read address decoder 23 decodes the value of the read counter 22 in synchronism with the assert timing to read the received data items out of the unit storage area. Subsequently, a counter controller 27 increments the read counter 22 in synchronism with the negate timing of the strobe signal DS. Thus, the read counter 22 holds the next read position. The increment operation of the read counter 22 by the counter controller 27 is determined by state signals LDS and HDS which conform to the levels of the bus low signal BL and bus high signal BH. More specifically, in the case where the bus low signal BL and the bus high signal BH are both asserted to the high level to hold both the state signals LDS and HDS at the high level, the counter controller 27 increments the read counter 22 twice by the use of count clock pulses RRC1 and RRC2. When both BL and BH are asserted to a high level, data transfer can proceed using both the lower 8-bits and the higher 8-bits of the 16-bit data bus. This is based on the determination that, when the data items are to be read in a 16-bit unit by the host device, two of the unit storage areas are simultaneously selected. Further, in a case where only one of the bus low signal BL and the bus high signal BH is asserted, the counter controller 27 increments the read counter 22 once by the use of either the count clock pulse RRC1 or the count clock pulse RRC2. When only one of BL and BH is asserted high, data transfer proceeds using either the lower 8 bit or the higher 8 bits of the 16-bit data bus.

In the empty state, when all data items stored in the unit storage areas $RE_0-RE_m$ have been read out information to be read out does no longer exists. In order to prevent reading in the empty state, an empty state detection circuit 29 is provided. Empty state detection circuit 29 receives the number of stored data items calculated by the arithmetic unit 15 to determine whether the bit cell array 13 is in the empty state. The detection result signal RES of the circuit 29 is applied to the read address decoder 23 and the counter controller 27. Thus, the change of the strobe signal RRS is not utilized.

Receiving FIFO Memory 6 . . . 2-byte Parallel Read

Figure 8:
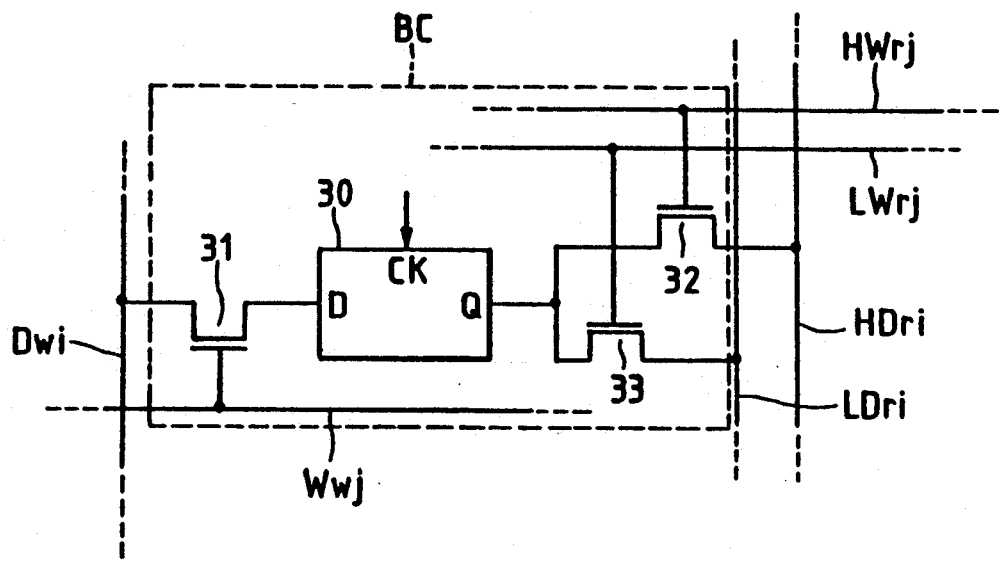
FIG. 8 is a circuit diagram showing a bit cell which is included in the receiving FIFO memory.

For the purpose of making it possible to read out the received data items in a 1-byte (8-bit) unit, each bit cell BC has a construction as shown in FIG. 8, though not especially restricted. Every two units are in parallel in the bit cell array 13. Referring to the figure, one of the write data lines $D_{wi}$ (i=0–7) corresponding to the bit cell BC is coupled through a selection switch 31 to the data input terminal D of a latch circuit such as D-type flip-flop 30. A higher-bit read data line $HD_{ri}$ and a lower-bit read data line $LD_{ri}$ are connected in common to the data output terminal Q of the latch circuit 30 through respective selection switches 32 and 33. The selection terminal of the selection switch 31 is coupled to one of the write word lines $W_{wj}$ (j=0–m). The selection terminals of the respective selection switches 32 and 33 are separately connected to a higher-bit read word line $HW_{rj}$ and a lower-bit read word line $LW_{rj}$. As illustrated in FIG. 2, the write word line $W_{wj}$, higher-bit read word line $HW_{rj}$, and lower-bit read word line $LW_{rj}$ are connected in common to the 8 bit cells BC of one row constituting one unit storage area, while the write data line $D_{wi}$, higher-bit read data line $HD_{ri}$ and lower-bit read data line $LD_{ri}$ are connected in common to the n bit cells BC of one column.

The write data lines $D_{w0}-D_{w7}$ are coupled to the data output terminals of the receiving circuit 2 through an internal bus 35 of 8 bits, shown in FIG. 1A. The lower-bit read data lines $LD_{r0}-LD_{r7}$ and the higher-bit read data lines $HD_{r0}-HD_{r7}$ are respectively connected to the bus interface unit 5 through an internal bus 36 of 8 bits and an internal bus 37 of 8 bits shown in FIG. 1A. The lower-bit read data lines and higher-bit read data lines are respectively interfaceable with the lower 8 bits and higher 8 bits of the 16-bit data bus of the system bus 8 through the bus interface unit 5.

The write word lines $W_{w0}-W_{wm}$ are connected in sequence to the output terminals of the write address decoder 21. Write address decoder 21 decodes the count value given by the write counter 20 and forms select signals $RS_{w0}-RS_{wm}$. A predetermined one of these write word lines is asserted to a selection level, such as high level, in accordance with the decoded result of the count value supplied from the write counter 20. When one write word line $W_{wj}$ is brought to the selection level, the received data items of 8 bits supplied from the write data lines $D_{w0}-D_{wm}$ are written into the unit storage area $RE_j$. $RE_j$ is configured of the 8 bit cells BC of one row connected to the write word line $W_{wj}$. The write timing of the write operation is determined according to the clock change or level of a signal which is supplied to the clock input terminal CK of the latch circuit 30. By way of example, the signal of the write word line $W_{wj}$ will be applied to the clock input terminal CK as it is.

The operation of selecting the lower-bit read word lines $LW_{r0}-LW_{rm}$ and the higher-bit read word lines $HW_{r0}-HW_{rm}$ is performed by a selection control circuit 40 which receives select signals $RS_{r0}-RS_{rm}$ delivered from the read address decoder 23. The read address decoder 23 brings one of the select signals $RS_{r0}-RS_{rm}$ to a selection level such as high level in accordance with the decoded result of the count value given by the read counter 22.

The selection control circuit 40 performs a control which permits data items of 2 bytes to be read out in parallel. Only one select operation by the decoder 23 is required. It is constructed of selectors $RSEL_0-RSEL_m$ which are disposed for the respective unit storage areas $RE_0-RE_m$.

Figure 4:
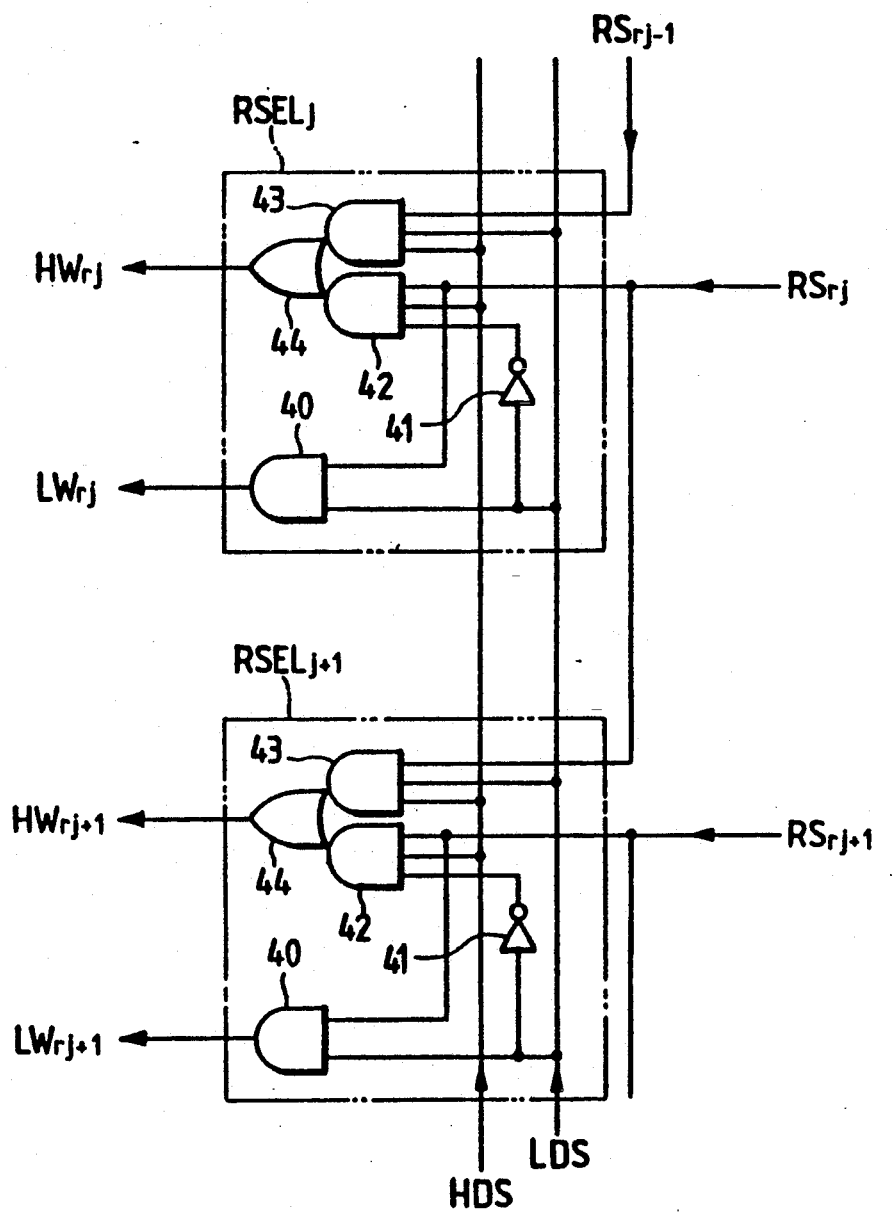
FIG. 4 is a logic circuit diagram showing a selection control circuit which is included in the receiving FIFO memory.

Each of the selectors $RSEL_0-RSEL_m$ includes identical logic gates. The selector $RSEL_j$, for example, is configured, as shown in FIG. 4, of an AND gate 40, an AND gate 42, an AND gate 43, and an OR gate 44. AND gate 40 receives the select signal $RS_{rj}$ and a bus low state signal LDS corresponding to the bus low signal BL as two inputs and takes the logical product of the inputs and delivers the result to the lower-bit read word line $LW_{rj}$. AND gate 42 receives the select signal $RS_{rj}$, a bus high state signal HDS corresponding to the bus high signal BH, and the inverted level signal of the bus low state signal LDS as delivered from an inverter 41, as three inputs and takes the logical product of the inputs. AND gate 43 receives the bus high state signal HDS, the bus low state signal LDS, and the select signal $RS_{rj-1}$ of the preceding stage as three inputs and takes the logical product of the inputs. OR gate 44 receives the outputs of the two AND gates 42 and 43 as two inputs and takes the logical sum of the inputs and delivers the result to the higher-bit read word line $HW_{rj}$.

Figure 6A:
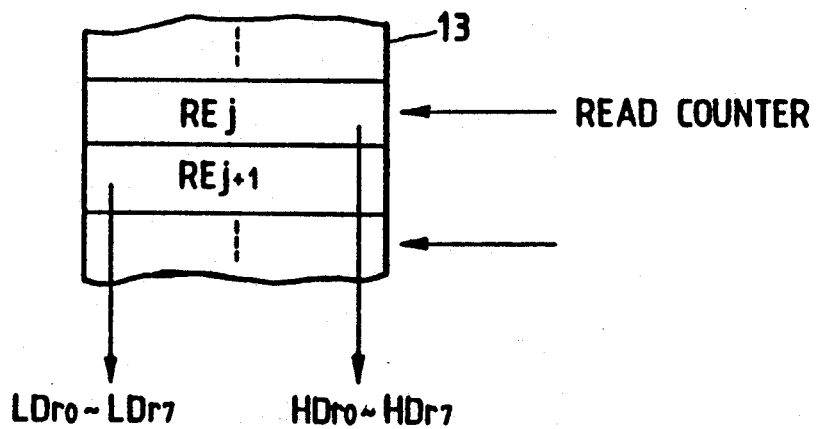
FIGS. 6A through 6C are explanatory diagrams showing the aspects of reading data out of the receiving FIFO memory.

When the 2 bytes of received data items are to be read out in parallel, the bus low state signal LDS and the bus high state signal HDS are both set at the high level. Let it be assumed that the read counter 22 indicates the unit storage area $RE_j$, so the select signal $RS_{rj}$ is set at the selection level. Then, the AND gate 40 of the selector $RSEL_j$ and the AND gate 43 of the succeeding-stage selector $RSEL_{j+1}$, the AND gates receiving the select signal $RS_{rj}$, deliver signals of high level. Consequently, as illustrated in FIG. 6A, the received data items of the unit storage area $RE_j$ are fetched onto the higher-bit read data lines $HD_{r0}$–$HD_{r7}$, while the received data items of the unit storage area $RE_{j+1}$ are fetched onto the lower-bit read data lines $LD_{r0}$–$LD_{r7}$.

Figure 6B:
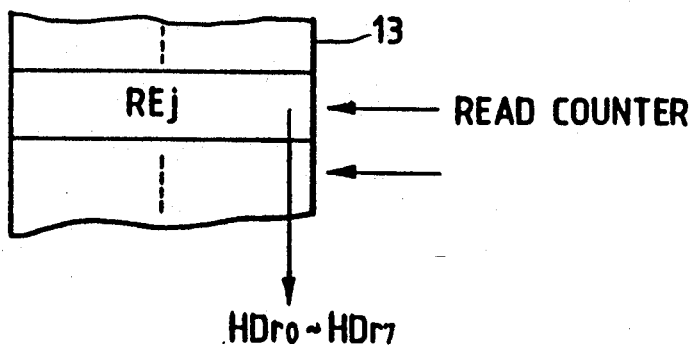

When the received data items are to be fetched onto the higher-bit read data lines $HD_{r0}$–$HD_{r7}$ in a byte unit, the bus high state signal HDS is set at the high level. Assuming that the read counter 22 indicates the unit storage area $RE_j$, the AND gate 42 of the selector $RSEL_j$, whose input signals such as the select signal $RS_{rj}$ at the selection level are all set at the high level, delivers a signal of high level. Consequently, as illustrated in FIG. 6B, the 1-byte data items are fetched from the unit storage area $RE_j$ onto the higher-bit read data lines $HD_{r0}$–$HD_{r7}$.

Figure 6C:
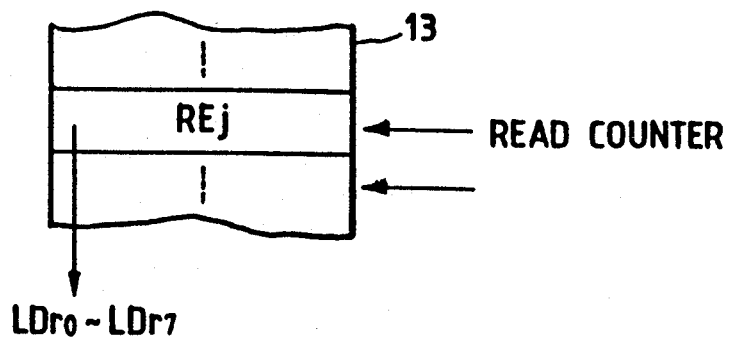

When the received data items are to be fetched onto the lower-bit read data lines $LD_{r0}$–$LD_{r7}$ in a byte unit, the bus low state signal LDS is set at the high level. Assuming that the read counter 22 indicates the unit storage area $RE_j$, the AND gate 40 of the selector $RSEL_j$, whose input signals such as the select signal $RS_{rj}$ at the selection level are all set at the high level, delivers a signal of a high level. Consequently, as illustrated in FIG. 6C, the 1-byte data items are fetched from the unit storage area $RE_j$ onto the lower-bit read data lines $LD_{r0}$–$LD_{r7}$.

Receiving FIFO Memory 6 . . . Calculation of the Number of Stored Data Items The arithmetic unit 15 calculates the number of stored data items of the receiving FIFO memory 6 on the basis of the count operations of the write counter 20 and the read counter 22. The read counter 22 and the write counter 20 repeat incrementation in accordance with the read and write operations. Incrementation starts from reset states in which count values $RCOUNT_r$ and $RCOUNT_w$ are zero, respectively. After each of the counters 22 and 20 has counted to (n−1) (where n denotes the number of storage stages, namely, the number of unit storage areas $RE_0$–$RE_m$ in the receiving FIFO memory 6), the corresponding count value returns to zero again. Although not especially restricted, the write counter 20 and the read counter 22 have statuses $RSTS_w$ and $RSTS_r$ which are inverted each time the count values $RCOUNT_w$ and $RCOUNT_r$ return to zero, respectively. The statuses $RSTS_w$ and $RSTS_r$ are reset to zero in initial states, and they are inverted from "0" to "1" and from "1" to "0" each time the respective count values $RCOUNT_w$ and $RCOUNT_r$ return to zero. By way of example, when the write counter 20 and read counter 22 are binary counters the statuses $RSTS_w$ and $RSTS_r$ correspond to upper digit bits next to the most significant bits of the count values $RCOUNT_w$ and $RCOUNT_r$, respectively.

FIG. 10 exemplifies the transition states of those values of the write counter 20 and read counter 22 which change according to the write and read operations, respectively. The states listed in FIG. 10 correspond to the case where the number of storage stages n of the receiving FIFO memory 6 is 4, and each of the write counter 20 and read counter 22 is constructed of a binary counter of 3 bits on this occasion. As understood from FIG. 10, when the statuses $RSTS_w$ and $RSTS_r$ are in agreement, a value obtained by subtracting the count value $RCOUNT_r$ of the read counter 22 from that $RCOUNT_w$ of the write counter 20 becomes the byte number of stored data items. Conversely, when the statuses $RSTS_w$ and $RSTS_r$ are in disagreement, a value which is obtained by subtracting the count value $RCOUNT_r$ of the read counter 22 from a value with the number of storage stages (n=4 in this example) added to the count value $RCOUNT_w$ of the write counter 20 becomes the byte number of stored data items.

The arithmetic unit 15 shown in FIG. 1A calculates the number of stored data items by the adoption of the above procedure. The arithmetic unit 15 is constructed of 1) a comparator 50 which decides whether statuses $RSTS_w$ and $RSTS_r$ agree; 2) an adder 51 which delivers the count value $RCOUNT_w$ of the write counter 20. Write counter 20 is left intact when agreement has been detected by the comparator 50. Adder 51 adds the number of storage stages n to the count value $RCOUNT_w$ when disagreement has been detected by comparator 50; and, 3) a subtractor 52 which subtracts the count value $RCOUNT_r$ of the read counter 22 from the output value of the adder 51 and delivers the number of stored data items. Additionally, the comparator 50 can be constructed of an exclusive OR gate or an exclusive NOR gate having 2 inputs. In the former case, a low level is output in response to the agreement of the two inputs. In the latter case, a high level is output in response to the agreement of the two inputs.

Figure 11A:
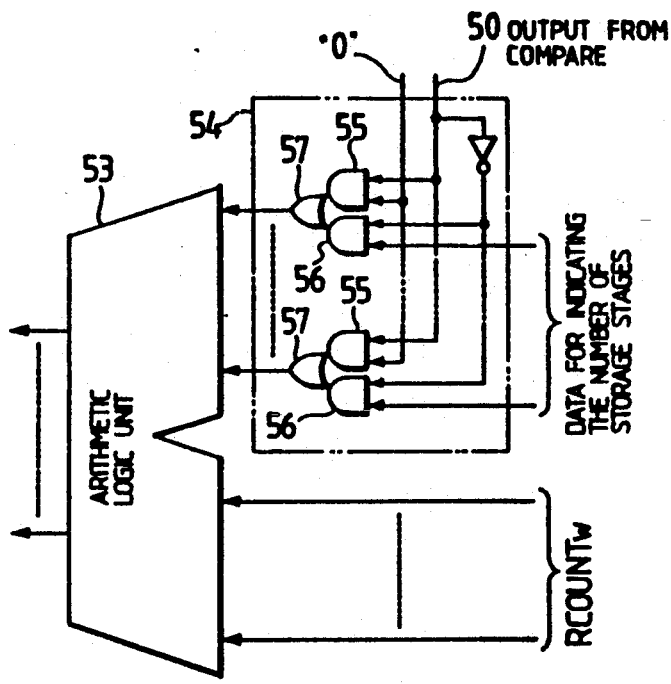
FIGS. 11A through 11C are logic circuit diagrams each showing the adder of an arithmetic unit which is included in the receiving FIFO memory.
Figure 11C:
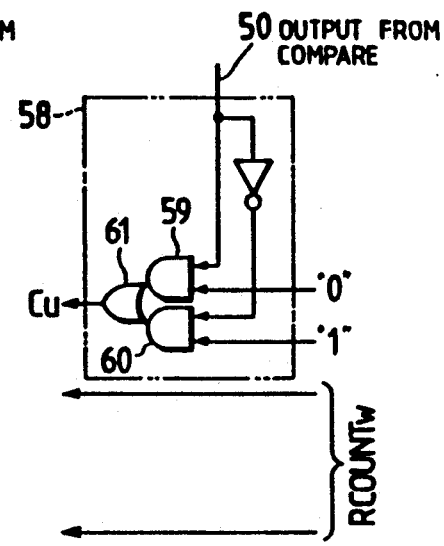
Figure 11B:
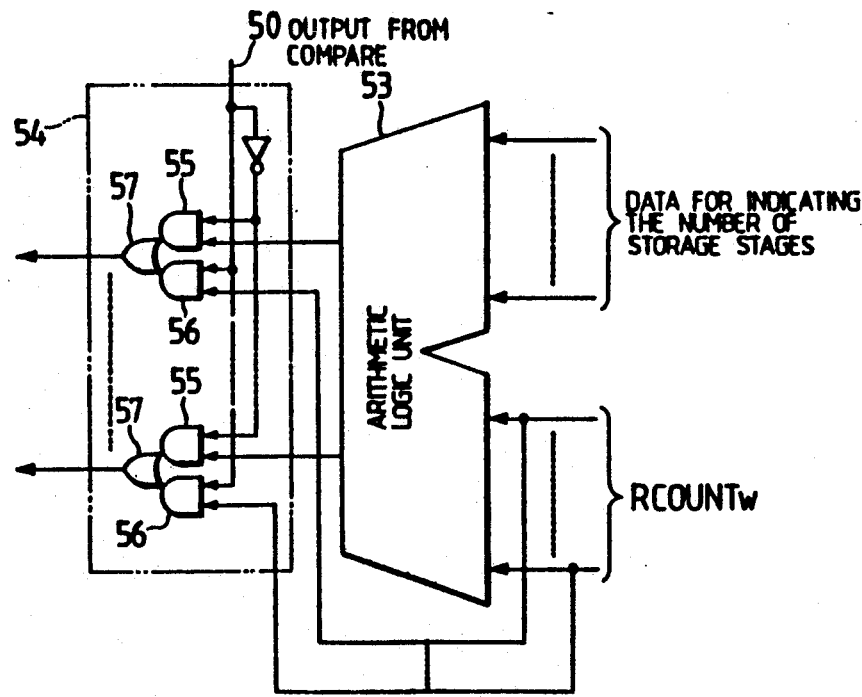

FIGS. 11A and 11B show examples of the case where the adder 51 is constructed of a constant addition circuit. The construction illustrated in FIG. 11A is such that one input side of an arithmetic logic unit 53 is supplied with the count value $RCOUNT_w$ of the write counter 20. The other input side thereof can be selectively supplied through a multiplexor 54 with data which indicates the number of storage stages n of the receiving FIFO memory 6. The multiplexor 54 has a combination of gates consisting of two AND gates 55, 56 and one OR gate 57, in correspondence with each bit of the data for indicating the number of storage stages n. When the output of the comparator 50, constructed of an exclusive NOR gate, is at its low level, the multiplexor 54 delivers the data indicating the number of storage stages n to the arithmetic logic unit 53, and when the output of the comparator 50 is at its high level, the multiplexor 54 supplies "O's" at all the bits thereof. The construction illustrated in FIG. 11B is in contrast to the construction of FIG. 11A. The multiplexor 54 is arranged on the output side of the arithmetic logic unit 53, so as to select the count value of the write counter 20 or the output value of the arithmetic logic unit 53 in accordance with the output of the comparator 50.

FIG. 11C shows an example of the adder 51 which is constructed without employing any arithmetic logic unit. Such a construction is applied to a case where the write counter 20 is a binary counter and where the count value $RCOUNT_w$ of the write counter 20 is fully decoded and used for designating the unit storage area. In this construction, an upper digit bit $C_u$ is added next to the most significant bit of the count value $RCOUNT_w$ which is output from the write counter 20. The value of the additional bit $C_u$ is selectively controlled to bit "0" or bit "1" by a multiplexor 58 in accordance with the output of the comparator 50. Giving the bit "1" to the additional bit $C_u$ in this construction, is equivalent to the addition of the number of storage stages n to the count value $RCOUNT_w$. Thus, the construction of the adder 51 can be made simpler than in the case when an arithmetic logic unit is employed. Incidentally, the multiplexor 58 consists of two AND gates 59, 60 and one OR gate 61. When the output of the comparator 50, constructed of the exclusive NOR gate, is at the low level, the multiplexor 58 affords "1" to the additional bit $C_u$. When the comparator output is at the high level, the multiplexor affords "0". The significance of the additional bit $C_u$ in the subtractor 52 differs depending upon the circuit arrangement of subtractor 52. The additional bit can be utilized for a carry, by way of example.

Receiving FIFO Memory 6 . . . Transfer Ready Control

Although not especially restricted, the "transfer ready" generation unit 16 is constructed including a control register 70, in which the information for determining the assert timing of the DMA transfer request signal DREQ1 can be set at will by the CPU 9, a comparator 71, which decides whether or not the number of stored data items delivered from the arithmetic unit 15 has exceeded the set value of the control register 70, the empty state detection circuit 29, which has been described before, and an RS flip-flop of set/reset type 72, which has the output of the comparator 71 applied to its set terminal S and the output of the empty state detection circuit 29 applied to its reset terminal R. The RS flip-flop also delivers the DMA transfer request signal DREQ1 from its output terminal Q. When the number of stored data items in the receiving FIFO memory 6 has exceeded the value set in the control register 70, the RS flip-flop 72 is brought into a set status by the output of the comparator 71. The DMA transfer request signal DREQ1 is then asserted. When the DMA controller 10 accepts this request signal, the receiving FIFO memory 6 is accessed through the bus interface unit 5. The received data items are successively read out and transferred in the single addressing mode. When the number of stored data items becomes zero in the course of the data read, the empty state detection circuit 29 resets the RS flip-flop 72 so as to negate the DMA transfer request signal DREQ1. When the DMA transfer request signal DREQ1 is negated, the DMAC 10 interrupts its data transfer control in the corresponding data transfer channel. Here, in the case where the number of data transfer words transferred does not reach the required number of words, the DMAC 10 restarts the remaining data transfer control after the DMA transfer request signal DREQ1 is asserted again. The assert timing of the DMA transfer request signal DREQ1 is determined according to the condition value set in the control register 70. By altering the set value of the control register 70, the number of storage stages n of the receiving FIFO memory 6 becomes variable. This makes it possible to optimize the operating efficiency of the host system in accordance with the data processing capability or data processing situation of the system, and to further lessen overhead time for starting the DMA transfer.

Transmitting FIFO Memory 7

Although not especially restricted, the transmitting FIFO memory 7 includes 1) a bit cell array 113, which includes a plurality of unit storage areas $TE_0$–$TE_m$ each being configured of bit cells of 8 bits; 2) a FIFO control unit 114 which performs the selection control of the unit storage areas, etc.; 3) an arithmetic unit 15 which calculates the number of data items stored in the bit cell array 113; and, 4) a "transfer ready" generation unit 116 which generates the DMA transfer request signal DREQ2 by the use of the number of stored data items acquired by the arithmetic unit 115, and so on.

Figure 3:
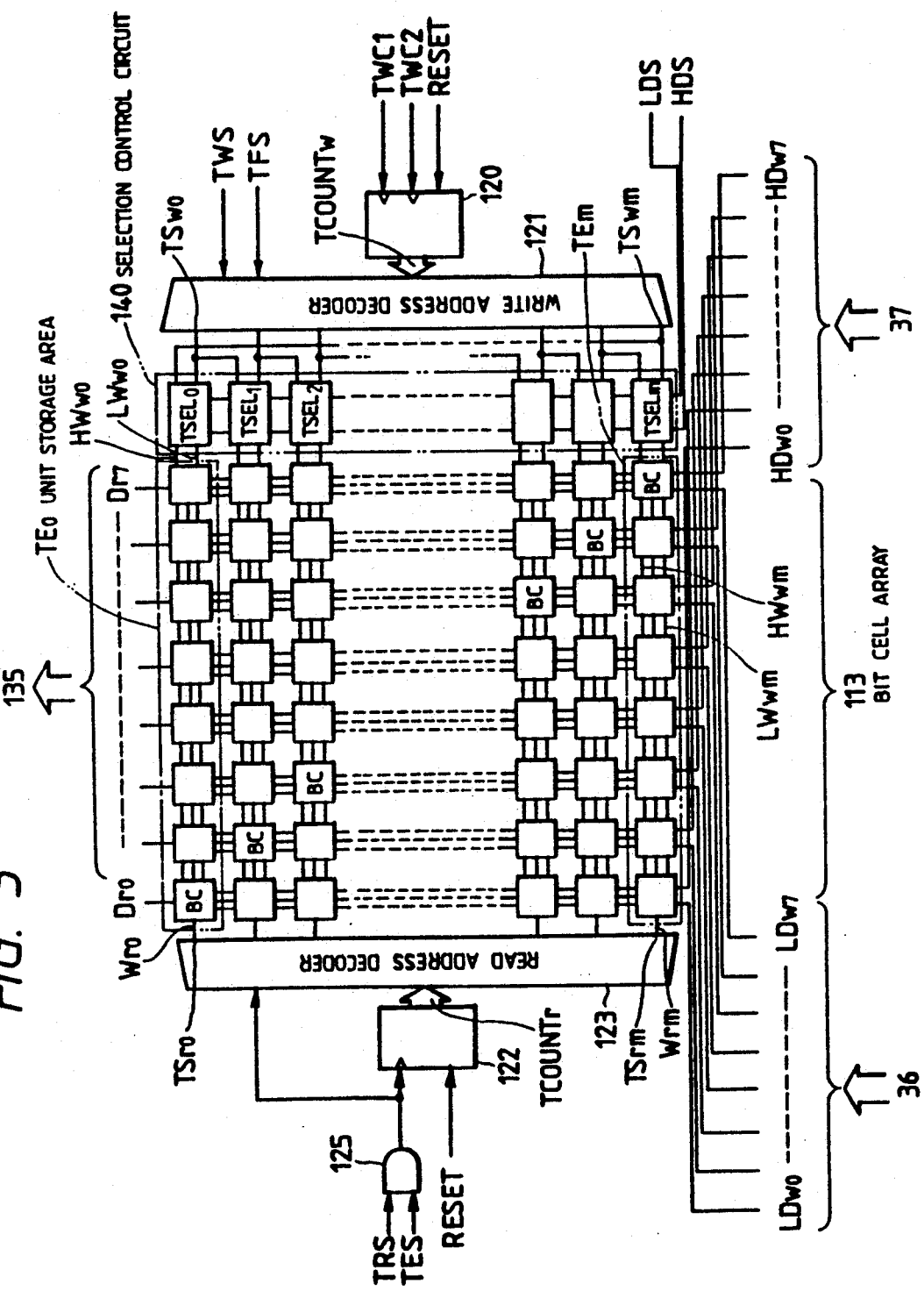
FIG. 3 is a block diagram showing a detailed example for selecting the unit storage area of the transmitting FIFO memory.

Although no special restriction is intended, the bit cell array 113 has the bit cells BC arranged in the shape of a matrix of n rows and 8 columns as shown in FIG. 3, similar to the case of the receiving FIFO memory 6. The 8 bit cells of each row constitute one of the 8-bit unit storage areas $TE_0$–$TE_m$.

The unit storage area of the bit cell array 113 into which data is written is designated by a write counter 120. The count data $TCOUNT_w$ of the write counter 120 is decoded by a write address decoder 121. Thus, the predetermined unit storage area is selected. On the other hand, the unit storage area in the operation of reading data is designated by a read counter 122. The count data $TCOUNT_r$ of the read count 122 is decoded by a read address decoder 123. Thus, the single unit storage area is selected. At the outset, the values of the write counter 120 and read counter 122 are initialized to zero.

Transmitting FIFO Memory 7 . . . Write Counter 120

The write counter 120 indicates which position of the head unit storage area is writable. The information of the position is output to the write address decoder 121. When the write operation of the transmitting FIFO memory 7 is initiated by the data strobe signal DS, read/write signal R/W, bus low signal BL and bus high signal BH which are output from the host devices, the bus interface unit 5 asserts a strobe signal TWS. The strobe signal TWS is synchronized with a timing at which the data strobe signal DS is asserted to a high level. This occurs when the read/write signal R/W is held at a write operation instruction level such as low level. The write address decoder 121 decodes the value of the write counter 120 synchronously with the assert timing, so as to select any of the unit storage areas and to write data items to-be-transmitted into the selected unit storage area. Subsequently, a counter controller 127 increments the write counter 120 synchronously with the negate timing of the strobe signal TWS. Thus, the write counter 120 holds the next write position. The increment operation of the write counter 120 by the counter controller 127 is determined by the state signals LDS and HDS which conform to the levels of the bus low signal BL and bus high signal BH. This is similar to the case of the receiving FIFO memory 6. More specifically, in a case where the bus low signal BL and the bus high signal BH are both asserted to the high level to hold both the state signals LDS and HDS at the high level, the counter controller 127 increments the write counter 120 twice by the use of count clock pulses TWC1 and TWC2. When BL and BH are both asserted to a high level, data transfer proceeds using both the lower 8 bits and the higher 8 bits of the 16-bit data bus. This is based on the determination that, when the data items are to be written in 16-bit unit by the host device, two of the unit storage areas are simultaneously selected. Conversely, in the case where only one of the bus low signal BL and the bus high signal BH is asserted, the counter controller 127 increments the write counter 120 once by the use of either the count clock pulse TWC1 or the count clock pulse TWC2. When only one of BL and BH is asserted high, either the lower 8 bits or the higher 8 bits of the 16-bit data bus are used.

Further, in the full state, in which data items to be transmitted have been written in all the unit storage areas $TE_0$-$TE_m$, new data to be transmitted cannot be written any longer. In order to prevent writing in the full state, a full state detection circuit 126 is provided which receives the number of stored data items calculated by the arithmetic unit 115 to decide whether the bit cell array 113 is in the full state. The detection result signal TES of the circuit 126 is applied to the write address decoder 121 and the counter controller 127. Thus, the change of the strobe signal TWS is not utilized.

Transmitting FIFO memory 7 . . . Read Counter 122

The read counter 122 indicates which position of the head unit storage area is readable. This information is output to the read address decoder 123. When the transmitting circuit 3 is to transmit data, it asserts a strobe signal TRS. When the strobe signal TRS passes through a gate 125, the read address decoder 123 first decodes the value of the read counter 122 synchronously with the assert timing of the strobe signal TRS. The data items to be transmitted are read out of the unit storage area selected by the decoded result. The read counter 122 is subsequently incremented synchronously with the negate timing of the strobe signal TRS. Thus, the read counter 122 holds the next read position.

Further, in the empty state, in which the data items have been read out of all the unit storage areas $TE_0$-$TE_m$, data to be transmitted cannot be read out any longer. In order to prevent the read operation of the transmitting FIFO memory 7 and also the transmit operation of the transmitter 3 in the empty state, an empty state detection circuit 129 is provided which receives the number of stored data items calculated by the arithmetic unit 115, to decide if the bit cell array 113 is in the empty state. The detection result signal TES of the circuit 129 is applied to the gate 125. Thus, in the empty state, the strobe signal TRS is not transmitted to the read counter 122 and the read address decoder 123. Further, substantially the same signal as the signal TES delivered from the empty state detection circuit 129 is also applied to the transmitting circuit 3 and the operation of the transmitting circuit 3 is disabled in response to the empty state of the transmitting FIFO memory 7.

Transmitting FIFO Memory 7 . . . 2-byte Parallel Write

Figure 9:
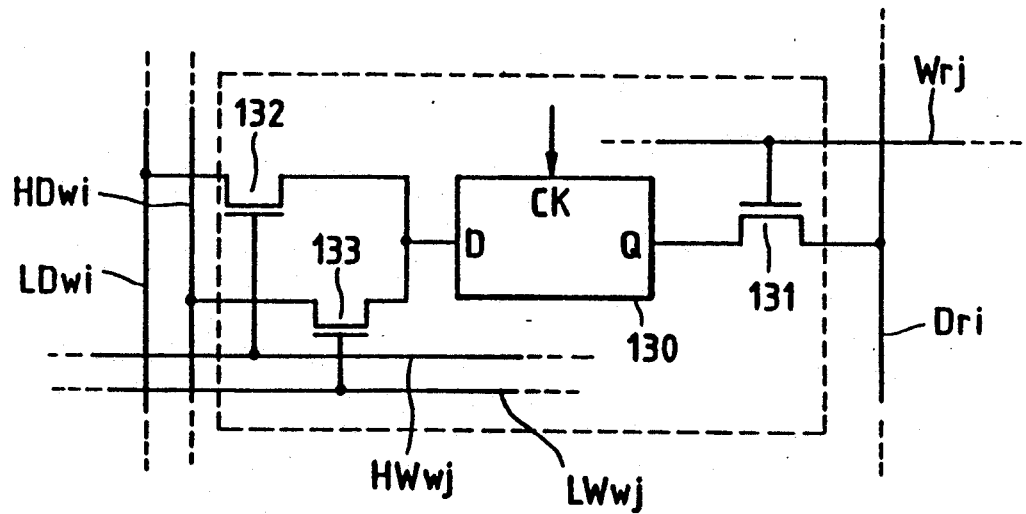
FIG. 9 is a circuit diagram showing a bit cell which is included in the transmitting FIFO memory.

For the purpose of making it possible to write the transmission data items in 1-byte (8-bit) unit, each bit cell BC has a construction as shown in FIG. 9, though not especially restricted. Adjacent units of the array are in parallel. Referring to the figure, one of read data lines $D_{ri}$(i=0-7) corresponding to the bit cell BC is coupled through a selection switch 131 to the data output terminal Q of a latch circuit such as D-type flip-flop 130. A higher-bit write data line $HD_w$ and a lower-bit write data line $LD_w$ are connected in common to the data input terminal D of the latch circuit 130 through respective selection switches 132 and 133. The selection terminal of the selection switch 131 is coupled to one of read word lines $W_{rj}$(j=0−m). The selection terminals of the respective selection switches 132 and 133 are separately connected to a higher-bit write word line $HW_{wj}$ and a lower-bit write word line $LW_{wj}$. As illustrated in FIG. 3, the read word line $W_{rj}$, higher-bit write word line $HW_{wj}$ and lower-bit write word line $LW_{wj}$ are connected in common to the 8 bit cells BC of one row constituting one unit storage area. The read data line $D_{ri}$, higher-bit write data line $HD_{wi}$ and lower-bit write data line $LD_{wi}$ are connected in common to the n bit cells BC of one column. The read data lines $C_{r0}$-$D_{r7}$ are coupled to the data input terminals of the transmitting circuit 3 through an internal bus 135 of 8 bits shown in FIG. 1B. The lower-bit write data lines $LD_{w0}$-$LD_{w7}$ and the higher-bit read data lines $HD_{r0}$-$HD_{r7}$ are respectively connected to the bus interface unit 5 through the internal bus 36 of 8 bits and the internal bus 37 of 8 bits shown in FIG. 1B. The write and read data lines are respectively interfaceable with the lower 8 bits and higher 8 bits of the 16-bit data bus of the system bus 8 through the bus interface unit 5.

The read word lines $W_{r0}$-$W_{rm}$ are connected in sequence to the output terminals of the read address decoder 123 which decodes the count value given by the read counter 122 and forms select signals $TS_{r0}$-$TS_{rm}$. A predetermined read word line is asserted to a selection level such as high level in accordance with the decoded result of the count value supplied from the read counter 122. When the read word line W is brought to the selection level, the transmission data items of 8 bits are delivered to the read data lines $D_{r0}$-$D_{r7}$ from the unit storage area $TE_j$. $TE_j$ is configured of the 8 bit cells BC of one row connected to the read word line $W_{rj}$.

The operation of selecting the lower-bit write word lines $LW_{w0}$-$LW_{wm}$ and the higher-bit write word lines $HW_{w0}$-$HW_{wm}$ is performed by a selection control circuit 140 which receives select signals $TS_{w0}$-$TS_{wm}$ delivered from the write address decoder 121. The write address decoder 121 brings one of the select signals $TS_{w0}$-$TS_{wm}$ to a selection level such as high level in accordance with the decoded result of the count value given by the write counter 120.

The selection control circuit 140 performs a control which permits data items of 2 bytes to be written in parallel utilizing only one select operation by the write address decoder 121. It is constructed of selectors $TSEL_0$-$TSEL_m$ which are disposed for the respective unit storage areas $TE_7$-$TE_m$.

Figure 5:
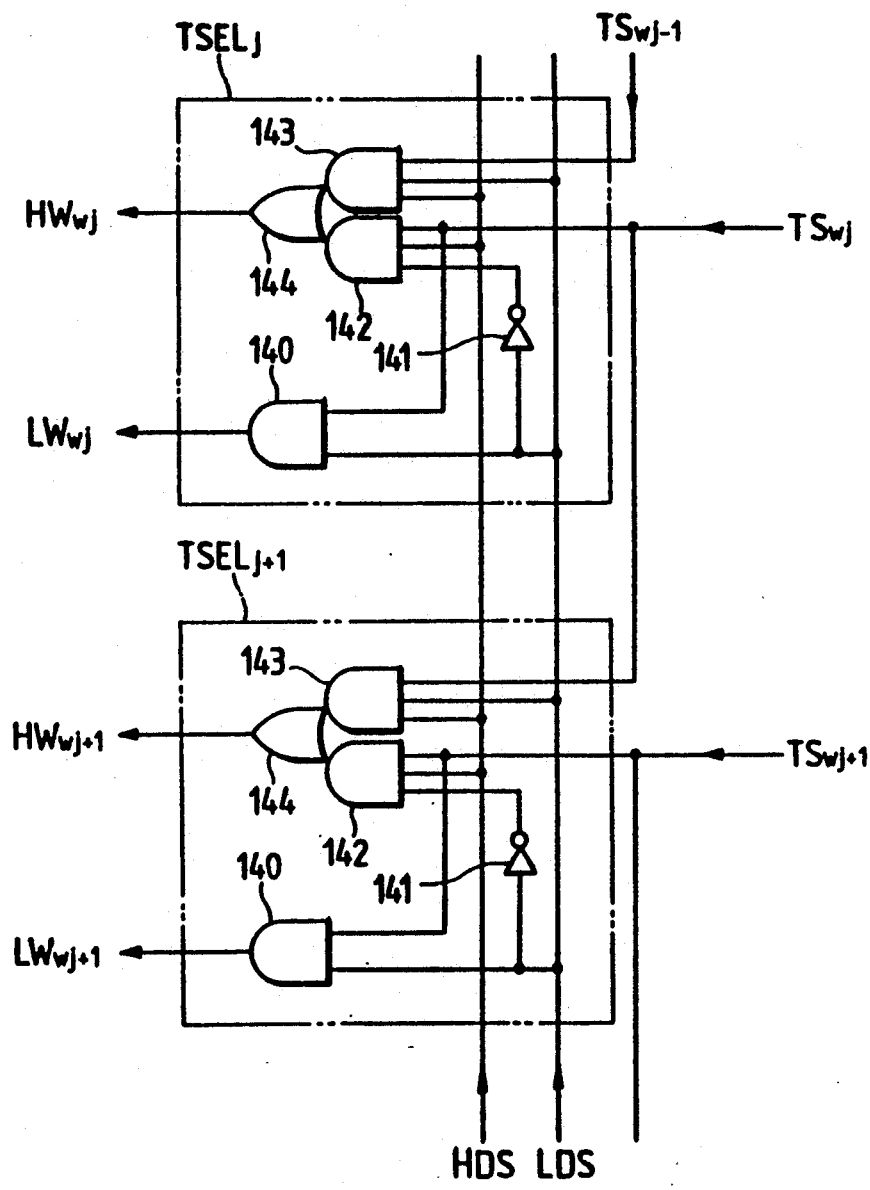
FIG. 5 is a logic circuit diagram showing a selection control circuit which is included in the transmitting FIFO memory.

Each of the selectors $TSEL_0$-$TSEL_m$ includes identical logic gates. The selector $TSEL_j$, for example, is configured, as shown in FIG. 5, of 1) an AND gate 140, which receives the select signal $TS_{rj}$ and the bus low state signal LDS corresponding to the bus low signal BL as two inputs and which takes the logical product of the inputs and delivers the result to the lower-bit write word line $LW_{wj}$; 2) an AND gate 142, which receives the select signal $TS_{rj}$, the bus high state signal HDS corresponding to the bus high signal BH, and the inverted level signal of the bus low state signal LDS as delivered from an inverter 141, as three inputs and which takes the logical product of the inputs; 3) an AND gate 143, which receives the bus high state signal HDS, the bus low state signal HDS, and the select signal $TS_{rj-1}$ of the preceding stage as three inputs and which takes the logical product of the inputs; and, 4) an OR gate 144 which receives the outputs of the two AND gates 142 and 143 as two inputs and which takes the logical sum of the inputs and delivers the result to the higher-bit write word line $HW_{wj}$.

Figure 7A:
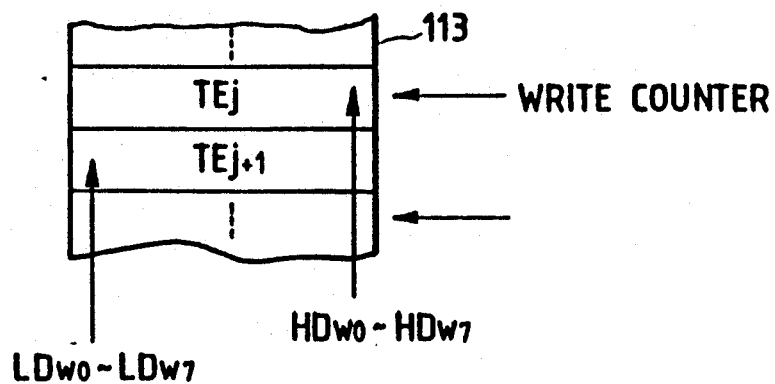
FIGS. 7A through 7C are explanatory diagrams showing the aspects of reading data out of the transmitting FIFO memory.

When the 2 bytes of transmission data items are to be written in parallel, the bus low state signal LDS and the bus high state signal HDS are both set at the high level. Let it be assumed that the write counter 120 indicates the unit storage area $TE_j$, so the select signal $TS_{rj}$ is set at the selection level. Then, the AND gate 140 of the selector TSEL$_j$ and the AND gate 143 of the succeeding-stage selector TSEL$_{j+1}$, the AND gates receiving the select signal TS$_{rj}$, deliver signals of a high level. Consequently, as illustrated in FIG. 7, the transmission data items of one byte are written into the unit storage area TE$_j$ from the higher-bit write data lines HD$_{w0}$-HD$_{w7}$. The transmission data items of the other byte are written in parallel into the next unit storage area TE$_{j+1}$ from the lower-bit write data lines LD$_{w0}$-LD$_{w7}$.

Figure 7B:
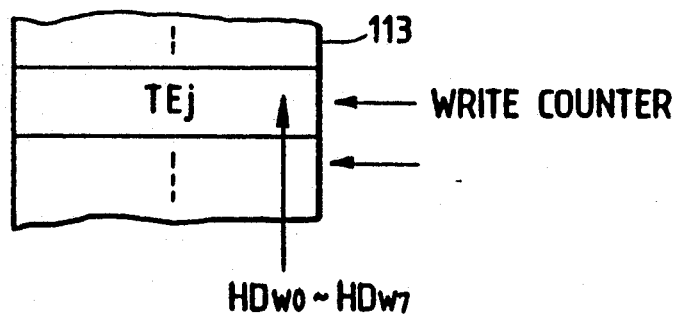

When the transmission data items are to be written from the higher-bit write data lines HD$_{w0}$-HD$_{w7}$ in a byte unit, the bus high state signal HDS is set at the high level. Assuming that the write counter 120 indicates the unit storage area TE$_j$, the AND gate 142 of the selector TSEL$_j$, whose input signals such as the select signal TS$_{rj}$ at the selection level are all set at the high level, delivers a signal of a high level. Consequently, as illustrated in FIG. 7B, the 1-byte data items are written into the unit storage area TE$_j$ onto the higher-bit write data lines HD$_{w0}$-HD$_{w7}$.

Figure 7C:
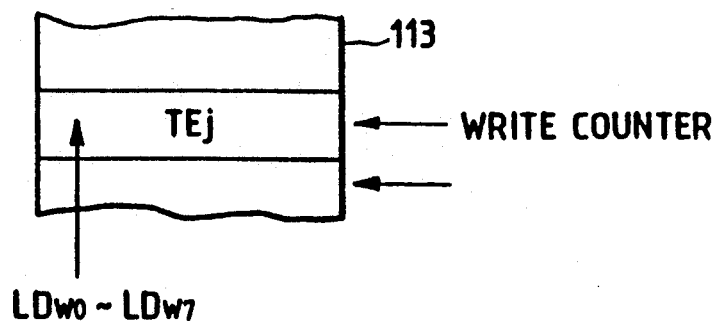

When the transmission data items are to be written from the lower-bit write data lines LD$_{w0}$-LD$_{w7}$ in a byte unit, the bus low state signal LDS is set at the high level. Assuming that the write counter 120 indicates the unit storage area TE$_j$, the AND gate 140 of the selector TSEL$_j$, whose input signals such as the select signal TS$_{rj}$ at the selection level are all set at the high level, delivers a signal of a high level. Consequently, as illustrated in FIG. 7C, the 1-byte data items are written into the unit storage area TE$_j$ through the lower-bit write data lines LD$_{w0}$-LD$_{w7}$.

Transmitting FIFO Memory 7 ... Calculation of the Number of Stored Data Items

The arithmetic unit 115 calculates the number of stored data items of the transmitting FIFO memory 7 on the basis of the count operations of the write counter 120 and the read counter 122. The read counter 122 and the write counter 120 repeat incrementation in accordance with read and write operations, starting from reset states in which count values TCOUNT$_r$ and TCOUNT$_w$ are zero, respectively. After each of the counters 122 and 120 has counted to (n−1) (where n denotes the number of storage stages, namely, the number of unit storage areas TE$_0$-TE$_m$ in the transmitting FIFO memory 7), the corresponding count value returns to zero again. Although not especially restricted, the write counter 120 and the read counter 122 have statuses TSTS$_w$ and TSTS$_r$ which are inverted each time the count values TCOUNT$_w$ and TCOUNT$_r$ return to zero, respectively. The statuses TSTS$_w$ and TSTS$_r$ are reset to zero in initial states, and they are inverted from "0" to "1" and from "1" to "0" each time the respective count values TCOUNT$_w$ and TCOUNT$_r$ return to zero. By way of example, when the write counter 120 and read counter 122 are binary counters, the statuses TSTS$_w$ and TSTS$_r$ correspond to upper digit bits next to the most significant bits of the count values TCOUNT$_w$ and TCOUNT$_r$, respectively.

The transition states of those values of the write counter 120 and read counter 122 which change according to the write and read operations are basically the same as the states listed in FIG. 10. In the case where the statuses TSTS$_w$ and TSTS$_r$ are in agreement, the value obtained by subtracting the count value TCOUNT$_r$ of the read counter 122 from TCOUNT$_w$ of the write counter 120 becomes the byte number of stored data items. In the case where the statuses TSTS$_w$ and TSTS$_r$ are in disagreement, a value which is obtained by subtracting the count value TCOUNT$_r$ of the read counter 122 from a value corresponding to the number of storage stages n added to the count value TCOUNT$_w$ of the write counter 120 becomes the byte number of stored data items.

The arithmetic unit 115, shown in FIG. 1B, calculates the number of stored data items by the adoption of the above procedure. It is constructed of a 1) comparator 150 which decides the agreement or disagreement between the statuses TSTS$_w$ and TSTS$_r$; 2) an adder 151 which delivers the count value TCOUNT$_w$ of the write counter 120 when agreement has been detected by the comparator 150, and which adds the number of storage stages n to the count value TCOUNT$_w$ and delivers the sum when the disagreement has been detected; and, 3) a subtractor 152 which subtracts the count value TCOUNT$_r$ of the read counter 122 from the output value of the adder 151 and delivers the number of stored data items. Incidentally, the same circuit arrangement as described for the receiving FIFO memory 6 can be adopted for the comparator 150 or the adder 151.

Transmitting FIFO Memory 7 ... Transfer Ready Control

Although not especially restricted, the "transfer ready" generation unit 116 includes 1) a control register 170 in which the information for determining the assert timing of the DMA transfer request signal DREQ2 can be set at will by the CPU 9; 2) a control register 173 in which the information for determining the negate timing of the DMA transfer request signal DREQ2 can be set at will by the CPU 9; 3) a comparator 171 which decides whether the number of stored data items delivered from the arithmetic unit 115 has become less than the set value of the control register 170; 4) an empty state detection circuit 129 which has been described before; 5) a comparator 174 which decides whether the number of stored data items delivered from the arithmetic unit 115 has exceeded the set value of the control register 173; and, 6) an RS flip-flop of set/reset type 172 which has the output of the comparator 171 applied to its set terminal S and the output of the comparator 174 applied to its reset terminal R. The RS flip-flop also delivers the DMA transfer request signal DREQ2 from its output terminal Q. The number of storage data items to be used for the assert condition of the DMA transfer request signal DREQ2 is set in the control register 170, while the number of storage data items to be used for the negate condition of the signal DREQ2 is set in the other control register 173. When the number of stored data items in the transmitting FIFO memory 7 is less than the value set in the control register 170, the RS flip-flop 172 is brought into a set status by the output of the comparator 171. Thus, the DMA transfer request signal DREQ2 is asserted. When the DMA controller 10 accepts this request signal, the transmitting FIFO memory 7 is accessed for writing through the bus interface unit 5. The transmission data items are successively transferred from the RAM 11 to the transmitting FIFO memory 7 in the single addressing mode. When the number of stored data items of the transmitting FIFO memory 7 has exceeded the negate condition set in the control register 173, the RS flip-flop 172 is reset by the output of the comparator 174 to negate the DMA transfer request signal DREQ2. When the DMA transfer request signal DREQ2 is negated, the DMAC 10 interrupts its data transfer control in the corresponding data transfer channel and abandons the bus mastership of the system bus 8. Meanwhile, the transmitter 3 can transmit the stored data items of the transmitting FIFO memory 7 in regular sequence unless the number of stored data items becomes zero. The assert timing and negate timing of the DMA transfer request signal DREQ2 are determined according to the condition values set in the control registers 170, 173. By altering the set values of the control registers 170, 173, the number of storage stages n of the transmitting FIFO memory 7 becomes variable. This makes it possible to optimize the operating efficiency of the host system in accordance with the data processing capability or data processing situation of the system. It further lessens overhead time for starting the DMA transfer.

Effects attained by FIFO Memories 6, 7

In utilizing receiving FIFO memory 6 and the transmitting FIFO memory 7, the following effects are attained:

The receiving FIFO memory 6 and the transmitting FIFO memory 7 transfer data with the line control unit 4 in an 8-bit unit while they can transfer data with the bus interface unit 5 in 16-bit unit utilizing the internal buses 36 and 37, each consisting of 8 bits. Therefore, received data items and data items to-be-transmitted can be transferred at high speed between the FIFO memories and a host device such as the CPU 9.

One write data line and two read data lines are connected to each of the bit cells BC of the receiving FIFO memory 6. Two write data lines and one read data line are connected to each of the bit cells BC of the transmitting FIFO memory 7. Thus, when 2 bytes are read in parallel fashion through the bus interface unit 5, the selection control circuit 40 selects the unit storage area indicated by the read counter 22 of the receiving FIFO memory 6 and the next unit storage area. When 2 bytes are written in parallel fashion through the bus interface unit 5, the selection control circuit 140 selects the unit storage area indicated by the write counter 120 of the transmitting FIFO memory 7 and the next unit storage area. Therefore, each of the FIFO memories 6 and 7, having unit storage areas of 8-bit width, can be interfaced with the system bus 8 of 16 bits by a simple logic.

Each of the selection control circuits 40 and 140 include logic capable of switching control between parallel access in a 2-byte unit and access in a 1-byte unit. This is based on the bus low signal BL and bus high signal BH which are bus control signals applied from the host device side. Therefore, a bus swap ascribable to the difference of the host CPU 9 can be accomplished without utilizing any circuit externally mounted. Also, the handling of the FIFO memory can be enhanced.

The arithmetic unit 15 (151) which determines the number of stored data items in the receiving FIFO memory 6 (the transmitting FIFO memory 7), includes the comparator 50 (150). The comparator 50 substantially compares the value of the write counter 20 (120) and that of the read counter 22 (122). It calculates the number of stored data items on the basis of the value of the write counter 20 (120), the value of the read counter 22 (122) and the number of storage stages n of the unit storage areas $RE_0$-$RE_m$ ($TE_0$-$TE_m$). The number of stored data items is also determined in accordance with the result of the comparison by the comparator 50 (150).

The read counter 22 (122) and the write counter 20 (120) operate separately to give the arithmetic unit 15 (115) their respective count values. The arithmetic unit 15 (115) processes the values acquired from each of the counters. Even when read and write operations coincide, the number of stored data items can be accurately acquired.

The read counter 22 (122) and the write counter 20 (120) are respectively endowed with statuses $RSTS_r$ and $RSTS_w$ ($TSTS_r$ and $TSTS_w$). The statuses are inverted each time the count values are returned to initial values. The magnitude comparison between the value of the read counter 22 (122) and that of the write counter 20 (120) is made in such a way that the agreement/disagreement of both the statuses is decided by the comparator 50 (150). So, in calculating and acquiring the number of stored data items, magnitude discrimination is readily accomplished since the value of the write counter 20 (120) has been returned to its initial value after one circulation.

The control register 70 (170), capable of setting at will the assert condition of a "transfer ready" signal such as the DMA transfer request signal DREQ1 (DREQ2) for instructing the host device to transfer data, and the control register 173, capable of setting the negate condition of the "transfer ready" signal at will are provided. The assert timing and negate timing of the "transfer ready" signal are determined on the basis of the results of the comparisons between the set values of the registers and the number of stored data items acquired internally. Thus, the numbers of storage stages of the FIFO memories 6 and 7 can be controlled. It is permissible to render the numbers of data items to-be-stored of the FIFO memories 6, 7 relatively small when the load of the host device such as CPU 9, is light in any system operation. It is also permissible to render the numbers of data items to-be-stored large when the load is heavy. Thus, the flexibility of system operations can be enhanced with ease. Further, since the numbers of storage stages of the FIFO memories 6, 7 can be controlled, the frequency of data transfer requests is lowered in a high-speed operation. In other words, the overhead time for starting a data transfer control is reduced. Thus, the throughput of a system can be enhanced with ease.

In the transmitting FIFO memory 7, the negate condition of the transfer ready signal can be variable. In the case where transmission data items are successively transferred to a plurality of transmitting FIFO memories corresponding to the respective channels of a multi-channel network at the time of system start, the number of data items for the negate condition is set comparatively small. Thus, it is possible to eliminate a long bus occupation that results from data transfers to the transmitting FIFO memories.

Figure 12:
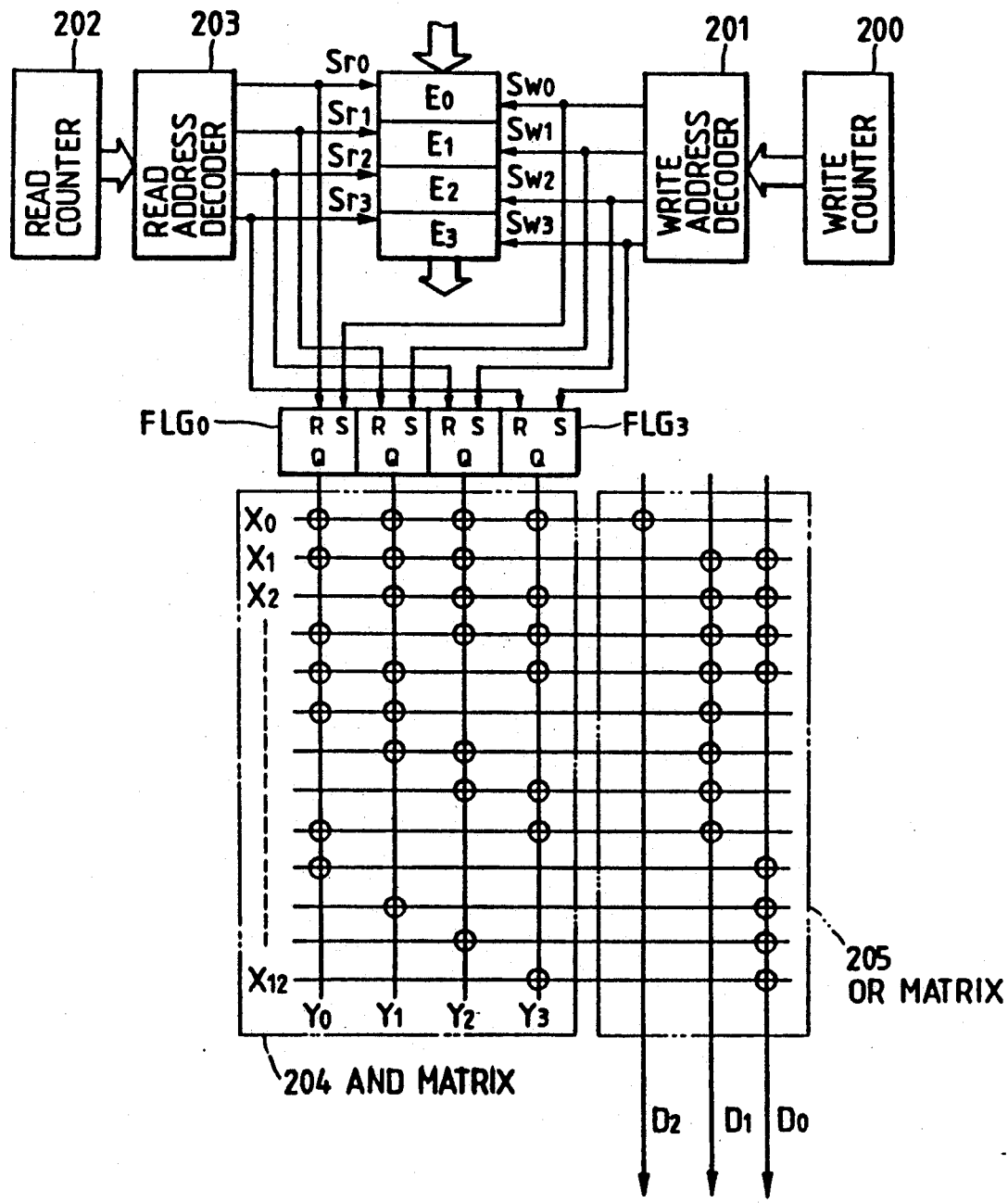
FIG. 12 is a block diagram of an example for calculating the number of stored data items by the use of flags.

Acquisition of the Number of Stored Data Items as based on the Utilization of Flags The number of stored data items in a FIFO memory can be obtained with a construction shown in FIG. 12, apart from the example of FIG. 1A or 1B performing the addition and the subtraction. FIG. 12 shows a FIFO memory having four unit storage areas $E_0$-$E_3$. A write counter 200 successively holds values for designating the unit storage areas into which data items are to be written. The value of the write counter 200 is decoded by a write address decoder 201. Thus, one unit storage area is selected by select signals $S_{w0}$-$S_{w3}$ delivered from the decoder 201. The data items are written into the selected area. On the other hand, a read counter 202 successively holds values for designating the unit storage areas from which data items are to be read. The value of the read counter 202 is decoded by a read address decoder 203. Thus, one unit storage area is selected by select signals $S_{r0}$-$S_{r3}$ delivered from the decoder 203. The data items are read out of the selected area. Incidentally, the increment operations of the write counter 200 and the read counter 202 are controlled in the same ways as in the description taken in conjunction with FIG. 1A or 1B.

In order to acquire the number of stored data items of the FIFO memory, flags $FLG_0$-$FLG_3$ corresponding to the unit storage areas $E_0$-$E_3$ in a one-to-one relationship are provided. The respective flags $FLG_0$-$FLG_3$ are set by the output signals $S_{w0}$-$S_{w3}$ of the write address decoder 201 and are reset by the output signals $S_{r0}$-$S_{r3}$ of the read address decoder 203. In other words, the flag corresponding to the unit storage area into which data items have been written is controlled into its set status. The flag corresponding to the unit storage area from which the data items have been read is reset. Accordingly, the number of stored data items corresponds to the number of the flags in the set statuses. In the example of FIG. 12, the flags $FLG_0$-$FLG_3$ are constructed of RS flip-flops of set/reset type, the set terminals S, which are respectively supplied with the select signals $S_{w0}$-$S_{w3}$, and the reset terminals R of which are respectively supplied with the select signals $S_{r0}$-$S_{r3}$.

By way of example, a logic gate array which includes an AND matrix 204 and an OR matrix 205 is employed for acquiring the number of stored data items from the outputs of the flags $FLG_0$-$FLG_3$ in FIG. 12. The AND matrix 204 is such that data lines $X_0$-$X_{12}$ orthogonally intersect the output signal lines $Y_0$-$Y_3$ of the respective flags $FLG_0$-$FLG_3$. The switching elements are disposed at required intersection positions indicated by marks "○". The selection terminals of the switching elements in each column are connected in common to the corresponding output signal lines $Y_0$-$Y_3$. The switching elements have an array adapted to individually decide all the combinations of cases where the flags $FLG_0$-$FLG_3$ can fall into the set statuses. More specifically, when the number of stored data items corresponds to 4 units, the data line $X_0$ applies a signal of a high level to the OR matrix 205; when the number of stored data items corresponds to 3 units, any of the data lines $X_1$-$X_4$ applies a signal of a high level to the OR matrix 205; when the number of stored data items corresponds to 2 units, any of the data lines $X_5$-$X_8$ applies a signal of a high level to the OR matrix 205; and, when the number of stored data items corresponds to 1 unit, any of the data lines $X_9$-$X_{12}$ applies a signal of a high level to the OR matrix 205. The OR matrix 205 is such that three output data lines $D_0$-$D_2$ orthogonally intersecting the data lines $X_0$-$X_{12}$ are arranged. The switching elements are disposed at required intersection positions indicated by marks "○". The switching elements in each row have their selection terminals connected to the corresponding one of the data lines $X_0$-$X_{12}$. The number of stored data items in terms of the number of units is delivered as 3-bit data to the output data lines $D_0$-$D_2$ in accordance with the statuses of the data lines $X_0$-$X_{12}$. The number of stored data items thus afforded to the output data lines $D_0$-$D_2$ is utilized for the "transfer ready" control.

Even in the case where the number of stored data items is acquired using the flags $FLG_0$-$FLG_3$ in this manner, it is reckoned with reference to the output count values of the read counter 202 and the write counter 200 which are operated separately from each other. Therefore, even when the read and write operations coincide, the number of stored data items can be accurately obtained.

External Output of the Number of Stored Data Items

The number of stored data items of the FIFO memory, which is utilized for the transfer ready control, may be directly output to the exterior. According to the construction of FIGS. 1A and 1B, by way of example, registers are provided in which the numbers of stored data items acquired by the arithmetic units 15 and 115 are respectively held. The host devices, such as the CPU 9, are rendered directly accessible to the registers through the bus interface unit 5. Thus, the CPU 9 can monitor the number of stored data items of the receiving FIFO memory 6 and the transmitting FIFO memory 7 at required timings. For example, in case of transmitting and receiving data in the HDLC (High-level Data Link Control) procedure, the number of stored data items is monitored in order to read out the control information of a control field from the receiving FIFO memory 6 and process it early. Or, the number of bytes of the data of an information field that remain unread in the receiving FIFO memory 6 is determined when frame check sequence information has been received. In this manner, a control can be performed according to the received information so that the host CPU 9 is capable of efficient protocol processing.

FIFO Memory 301

Figure 13:
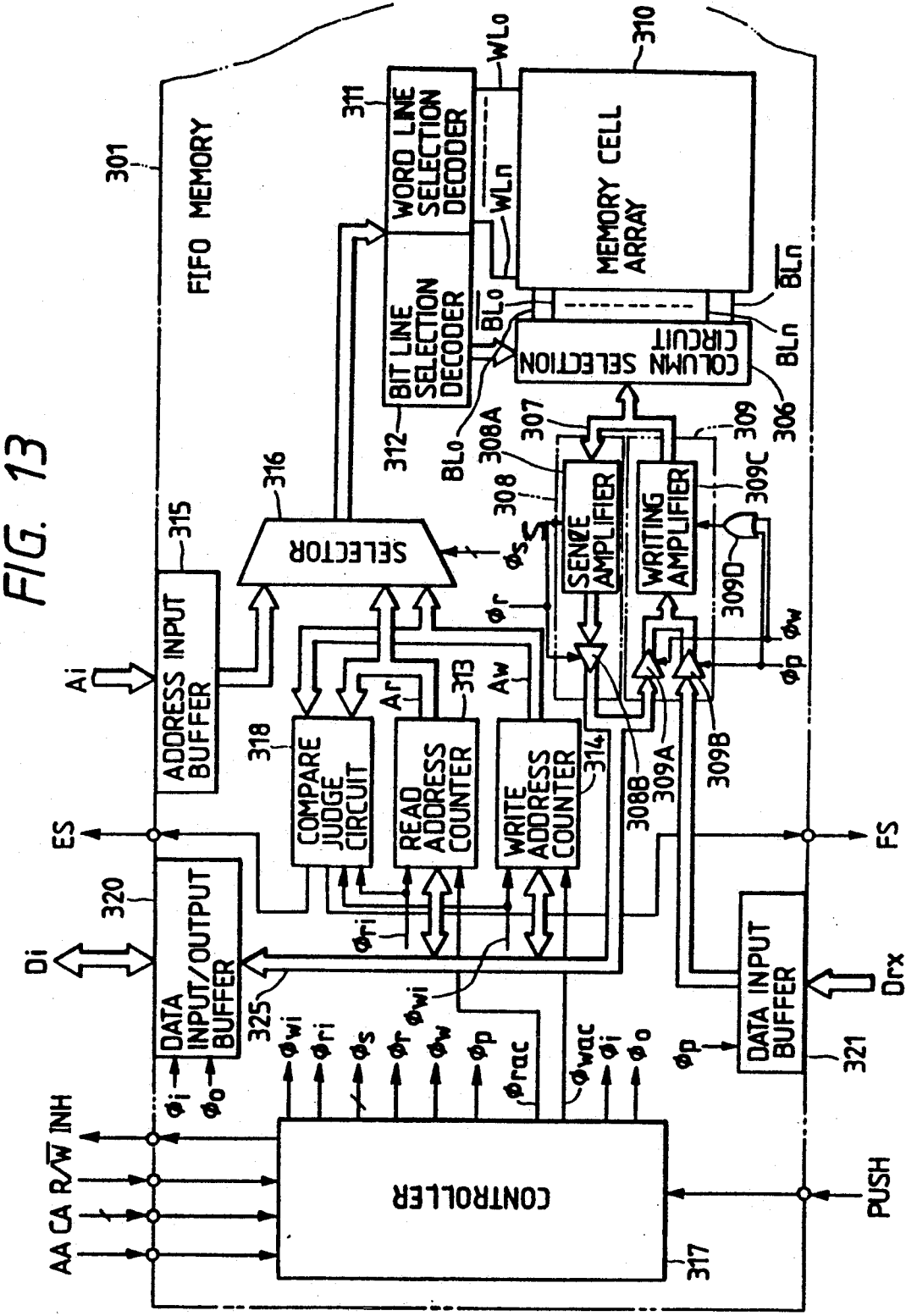
FIG. 13 is a block diagram of a FIFO memory which is another embodiment according to the present invention.

FIG. 13 shows a FIFO memory 301 which is still another embodiment of the present invention. Although not especially restricted, the FIFO memory 301 depicted in FIG. 13 is used as one function module which is included in a microcomputer or processor 302 shown in FIG. 14. Although no special restriction is intended, the processor 302 is formed on a single semiconductor substrate such as silicon substrate by techniques known in the semiconductor integrated circuits industry.

Figure 14:
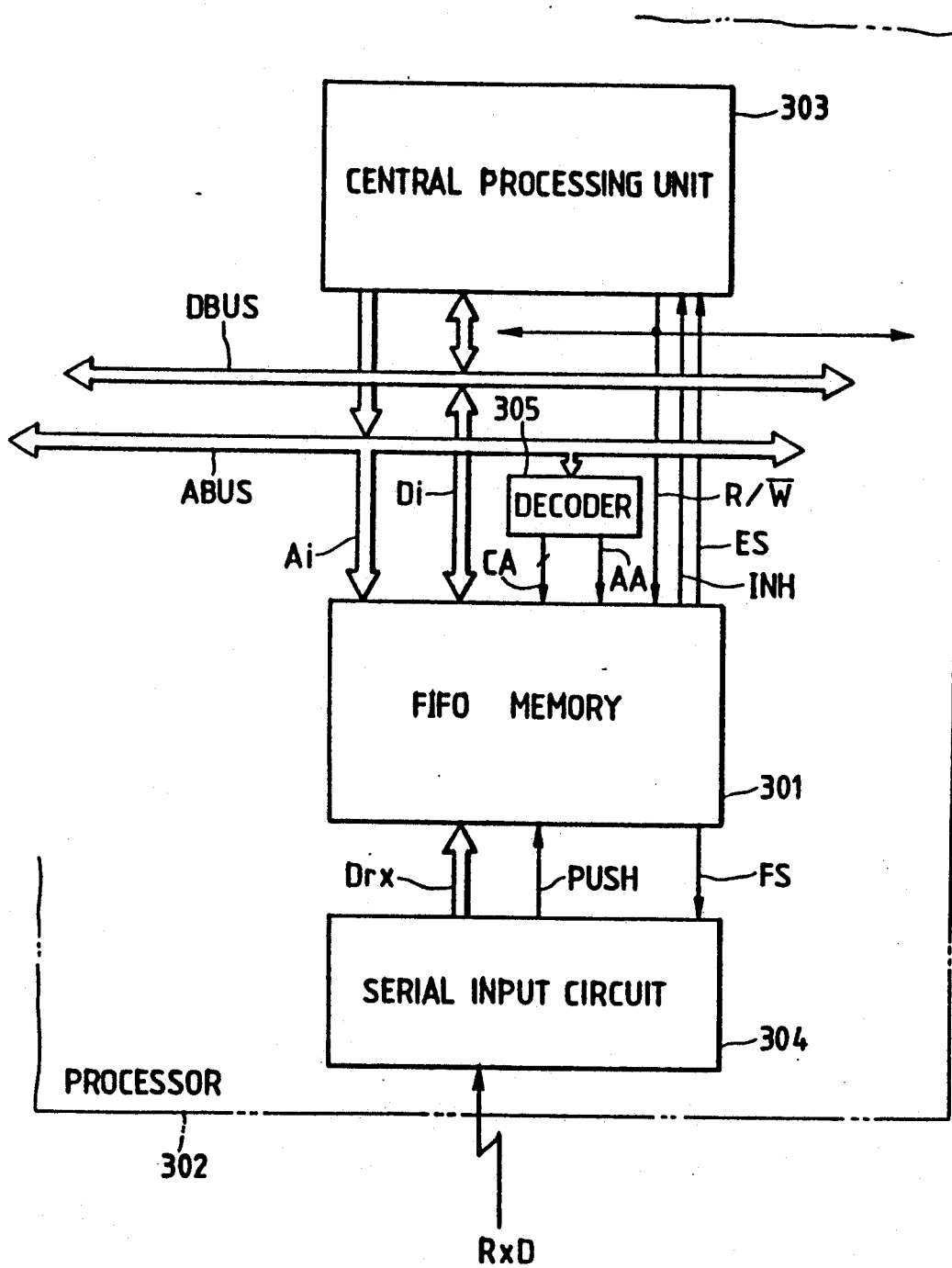
FIG. 14 is a block diagram showing the essential portions of a processor which is constructed so that the FIFO memory illustrated in FIG. 13 is included in a single semiconductor substrate.

First, the processor 302 will be outlined. In FIG. 14, a central processing unit 303 and a serial input circuit 304 are typically illustrated besides the FIFO memory 301. The serial input circuit 304 synchronizes or restores reception data items $R_{xD}$ supplied in bit-serial fashion and then accepts them. It converts the accepted data items into parallel data items and delivers the latter as an output. The FIFO memory 301 is utilized as a buffer memory which stores the data items supplied from the serial input circuit 304. This FIFO memory 301 is interfaced separately with the side of the serial input circuit 304 and with that of the central processing unit 303.

Circuit 304 supplies the interface portion of the FIFO memory 301 with the parallel converted reception data items $D_{rx}$ and with a push signal PUSH instructing the FIFO memory 301 to write the received data items $D_{rx}$ thereinto. Meanwhile, a full signal FS for informing the serial input circuit 304 of the state in which no empty memory cell exists in the FIFO memory 301 is supplied from the interface portion of the FIFO memory 301 on the side of the serial input circuit 304 to this serial input circuit 304.

The interface portion of the FIFO memory 301 on the side of the central processing unit 303 transfers data items $D_i$, and receives address signals $A_i$ from, the central processing unit 303, etc. through a data bus DBUS and an address bus ABUS. It receives control signals AA and CA generated in such a way that the predetermined bits of the address signal $A_i$ are decoded by a decoder 305. Further, it receives a read/write signal R/W from the central processing unit 303, etc. Meanwhile, an empty signal ES, for informing the CPU 303 of the state in which a data item to be read out does not exist in the FIFO memory 301 any longer, and an access inhibit status signal INH, for giving the CPU 303 the instruction of inhibiting the operation of access to the FIFO memory 301, are supplied from the interface portion of the FIFO memory 301 on the side of the CPU 303 to the CPU 303.

Although not especially restricted, the central processing unit 303 governs the control of the whole processor 302 and also performs protocol processing for the reception data items $R_{xD}$.

Now, the details of the FIFO memory 301 will be described in conjunction with FIG. 13. While the FIFO memory 301 basically executes the input/output of data items in the first-in first-out form, it is also capable of random accesses and the clearing of unnecessary data through the central processing unit 303.

Referring to FIG. 13, numeral 310 denotes a memory cell array in which a plurality of rewritable memory cells are arranged in the shape of a matrix. The memory cells included in the memory cell array 310, in respective rows, have their selection terminals coupled to corresponding word lines $WL_0$-$WL_n$. The memory cells in respective columns have their data input/output terminals coupled to corresponding complementary bit lines $BL_0$, $\overline{BL_0}$-$BL_n$, $\overline{BL_n}$. The complementary bit lines $BL_0$, $\overline{BL_0}$-$BL_n$, $\overline{BL_n}$ are connected to complementary common data lines 307 through column selection circuit 306. One of the memory cells included in the memory cell array 310 is addressed by a word line selection decoder 311 and a bit line selection decoder 312. More specifically, the word line selection decoder 311 decodes an address signal supplied thereto and drives a predetermined word line to a selection level. The bit line selection decoder 312 decodes an address signal supplied thereto and controls the column selection circuit 306 so as to construct a predetermined complementary pair of the complementary bit lines to the complementary common data lines 307. Although no special restriction is intended, a data item is read out of the memory cell addressed by the word line selection decoder 311 and the bit line selection decoder 312, by a read circuit 308 which includes a sense amplifier 308A and an output gate 308B. On the other hand, although no special restriction is intended, a data item is written into the addressed memory cell by a write circuit 309 which includes two input gates 309A, 309B and a write amplifier 309C.

The address signals $A_i$, used for random accesses by the central processing unit 303, are supplied to an address input buffer 315. Further, in order to internally generate access addresses, the FIFO memory 301 is furnished with a read address counter 313 and a write address counter 314 which are constructed of, e.g., binary counters. The write address counter 314 delivers write addresses $A_w$ successively at the respective data write operations based on the first-in form. The increment operation of the write address counter 314 is conducted so that a control signal $\phi_{wi}$, which is output from a controller 317, is asserted. On the other hand, the read address counter 313 delivers read addresses $A_r$ successively at the respective data read operations based on the first-out form. The increment operation of the read address counter 313 is constructed os that a control signal $\phi_{ri}$ which is output from the controller 317 is asserted.

The address signal $A_i$, internally accepted by the address input buffer 315, the address signal $A_r$ delivered from the read address counter 313, and the address signal $A_w$, delivered from the write address counter 314 are subjected to selection by a selector 316. The selected signal is supplied to the word line selection decoder 311 and the bit line selection decoder 312. The selection control of the selector 316 is carried out according to a control signal $\phi_s$ having a plurality of bits as is output from the controller 317.

The values of the read address counter 313 and the write address counter 314 are held in agreement in the initial states thereof. The address signal $A_r$ delivered from the read address counter 313 and the address signal $A_w$ delivered from the write address counter 314 are supplied to a compare judge circuit 318. Thus, the agreement/disagreement of the address signals is normally monitored. Upon detecting the agreement of both the values $A_r$ and $A_w$ in the write operation of the first-in type, the compare judge circuit 318 asserts the full signal FS to its high level in order to inform the serial input circuit 304 of the state in which no new writing is possible. Upon detecting the agreement of both the values $A_r$ and $A_w$ in the read operation of the first-out type, the compare judge circuit 318 asserts the empty signal ES to its high level in order to inform the central processing unit 303 of the state in which data items to be read no longer exist. Although not especially restricted, the compare judge circuit 318 detects the write operation of the first-in type on the basis of the instruction of the increment of the write address counter 314 by the control signal $\phi_{wi}$. It also detects the read operation of the first-out type on the basis of the instruction of the increment of the read address counter 313 by the control signal $\phi_{ri}$.

The output terminals of the output gate 308B included in the read circuit 308 and the input terminals of the input gate 309A included in the write circuit 309 are interfaced with the data bus DBUS through a data input/output buffer 320. The data input/output buffer is utilized for memory read accesses in the first-out form and the random accesses by the central processing unit 303. Further, the input terminals of the input gate 309B included in the write circuit 309 are interfaced with the serial input circuit 304 through a data input buffer 321 which is utilized for memory write accesses in the first-in form by this serial input circuit 304. The input/output control of data for the data input/output buffer 320 is performed by control signals $\phi_i$ and $\phi_o$ which are output from the controller 317 in accordance with the level of the read/write signal R/W. In addition, the input control of data for the data input buffer 321 is performed by a control signal $\phi_p$ which is output from the controller 317. Although no special restriction is intended, a read/write control for the read circuit 308 and the write circuit 309, in the case of the memory read accesses in the first-out form or the random accesses by the CPU 303 is initiated by control signals $\phi_r$ and $\phi_w$. $\phi_r$ and $\phi_w$ are output from the controller 317 in accordance with the level of the read/write signal R/W. A write control for the write circuit 309, in the case of the memory write accesses in the first-in form by the serial input circuit 304, is initiated by the control signal $\phi_p$. Although no special restriction is intended, the write amplifier 309C is initiated to operate by the output signal of an OR gate 309D which takes the logical sum of the control signals $\phi_p$ and $\phi_w$.

The read address counter 313 and write address counter 314 possess preset functions and are coupled to the data input/output buffer 320 through an internal data bus 325. Thus, the CPU 303 can read out the address signals $A_r$ and $A_w$ held in these counters, and it can rewrite the held values. The input/output gate of the read address counter 313 coupled to the data input/output buffer 320 is enabled or disabled by a control signal $\phi_{rac}$ which is output from the controller 317. Likewise, the input/output gate of the write address counter 314 coupled to the data input/output buffer 320 is enabled or disabled by a control signal $\phi_{wac}$ which is output from the controller 317.

Here, the control signal AA delivered from the decoder 305 is regarded as a signal whose high level designates the random access to the FIFO memory 301, as based on the address signal $A_i$. When the control signal AA is asserted to the high level, the controller 317 causes the selector 316 to select and deliver the address signal $A_i$, determined by the control signal $\phi_s$. The read or write operation in random access is initiated by the read/write signal R/W. In the case where the memory read operation is initiated by the read/write signal R/W, the control signals $\phi_r$ and $\phi_o$ are asserted, and the control signals $\phi_w$ and $\phi_i$ are negated. In the case where the memory write operation is initiated, the control signals $\phi_r$ and $\phi_o$ are negated, and the control signals $\phi_w$ and $\phi_i$ are asserted.

The control signal CA of 2 bits delivered from the decoder 305 is used as a control signal for initiating accesses to the read address counter 313 and write address counter 314. One predetermined bit contained in the control signal CA is regarded as a bit whose high level designates the access to the read address counter 313. The other bit is regarded as a bit whose high level designates the access to the write address counter 314. When the access to the read address counter 313 is initiated by the control signal CA, the controller 317 asserts the control signal $\phi_{rac}$ so as to enable the unshown input/output gate of the read address counter 313. On the other hand, when the access to the write address counter 314 is initiated by the control signal CA, the controller 317 asserts the control signal $\phi_{wac}$ so as to enable the unshown input/output gate of the write address counter 314. The read or write operation on this occasion is initiated by the read/write signal R/W, in accordance with whether control signals $\phi_i$ or $\phi_o$ is asserted. Thus, the input/output direction of data in the data input/output buffer 320 is controlled. Incidentally, when the read address counter 313 or write address counter 314 is to be accessed, the control signals $\phi_r$ and $\phi_r$ are both negated.

When, with the control signal AA negated to its low level, the read operation is initiated by the read/write signal R/W. The FIFO memory 301 is brought into a read operation made based on the first-out form conforming to the output address signal $A_r$ of the read address counter 313. The control signal $\phi_{ri}$ is thus asserted. Thus, the read address counter 313 is incremented. The address signal $A_r$ delivered from the incremented read address counter 313 is supplied to the word line selection decoder 311 and the bit line selection decoder 312 through the selector 316.

The push signal PUSH which is supplied from the serial input circuit 304 is regarded as a signal whose high level designates a write operation mode based on the first-in form conforming to the output address signal $A_w$ of the write address counter 314. When the push signal PUSH is asserted to its high level, the controller 317 asserts the control signal $\phi_{wi}$. Thus, the write address counter 314 is incremented. The address signal $A_w$ obtained is supplied to the word line selection decoder 311 and the bit line selection decoder 312 through the selector 316.

The FIFO memory 301 of this embodiment is accessible from both the central processing unit 303 and the serial input circuit 304. In order to avoid the conflict between the accesses from 303 and 304, therefore, the controller 317 generates the access inhibit status signal INH for giving the instruction of the inhibit of the access to the FIFO memory 301 by the CPU 303, though not especially restricted. Although no special restriction is intended, a logic for avoiding the conflict gives priority to a request for the access from the serial input circuit 304, and the access inhibit status signal INH is asserted in correspondence with the assert period of the push signal PUSH.

Next, the operation of the FIFO memory 301 will be described.

The serial input circuit 304 asserts the push signal PUSH and supplies the reception data items $D_{rx}$ to the FIFO memory 301 under the condition that the full signal FS is negated. Thus, the FIFO memory 301 stores the reception data items $D_{rx}$ in the memory cell array 310 in a regular sequence while incrementing the write address counter 314.

The central processing unit 303 instructs the FIFO memory 301 to perform the read operation based on the first-out form, under the condition that the empty signal ES and the access inhibit status signal INH are negated. Thus, the FIFO memory 301 reads out the received data items stored in the memory cell array 310 in regular sequence while incrementing the read address counter 313.

Unnecessary data items might arise among the received data items stored in the memory cell array 310, due to an error or the like in any system operation. Here, the operation of clearing the unnecessary data in such a case will be described. Let's consider a case, illustrated in FIG. 15A by way of example, where the data items of areas ED1 and ED2 in the address space of the memory cell array 310 have become unnecessary when the read address counter 313 and write address counter 314 appoint certain values $A_r$ and $A_w$, respectively. In this case, the central processing unit 303 may rewrite the value of the read address counter 313 to a value $A_r$, and that of the write address counter 314 to a value $A_w$, as illustrated in FIG. 15B. When the values of the read address counter 313 and write address counter 314 have been rewritten in this manner, the received data items $D_{rx}$ which are thereafter delivered from the serial input circuit 304 are written successively from the address of the value $A_w$, indicated by the write address counter 314. The unnecessary data remaining in the area ED2 is not utilized. Further in the case where the central processing unit 303 loads in the first-out form of the received data items stored in the memory cell array 310, the data items are read out successively from the address of the value $A_r$, indicated by the read counter 313.

The data remaining in the area ED1 is not utilized. Accordingly, the substantial clearing of the unnecessary data items can be easily carried out merely by the processing in which the CPU 303 rewrites the values of the read address counter 313 and write address counter 314. The process in which all the unnecessary data items are read out in sequence so as to update the value of the read address counter 313 is no longer required.

While clearing, in the case where the central processing unit 303 needs to know the states of the read address counter 313 and write address counter 314 in rewriting the values of these counters, the read address counter 313 and write address counter 314 are accessed in order to read the values thereof. It calculates the rewritten values $A_r'$, $A_w'$ on the basis of the respective loaded values $A_r$, $A_w$. Where the read accesses to the address counters 313 and 314 are required, and where the CPU 303 recognizes only the packet Nos. of unnecessary data items or the number of bytes or words thereof, it must obtain the values $A_r$, $A_w$ which serve as the references of the physical address space of the memory cell array 310 or the values to-be-calculated $A_r'$, $A_w'$.

When it has become necessary in any system operation to check data stored in of the FIFO memory 301, the central processing unit 303 random-accesses the FIFO memory 301 and loads the required data by the use of the address signal $A_i$. In the read operation, the control signal $\phi_{ri}$ is not asserted. So, the value of the read address counter 313 is maintained as is. In the random access, in a case where the CPU 303 requires address information serving as the reference of the physical address space of the FIFO memory 301 or the necessary address to-be-accessed, it can random-access the read address counter 313 or write address counter 314 and load the value thereof.

According to the FIFO memory 301, the following effects are attained:

When the selector 316 selects the external address signals $A_i$, the central processing unit 303 can obtain required data items from desired addresses other than addresses indicated by the read address counter 313 and write address counter 314. Thus, even when the sequences of reading and writing data items are prescribed by the values of the built-in address counters 313 and 314, random accesses are permitted.

In the case where unnecessary data has developed among data items stored in the memory cell array 310, the value(s) of the read address counter 313 or/and the write address counter 314 is (are) rewritten by the control of the central processing unit 303. Thus, the substantial clearing of the data in the FIFO memory 301 can be performed with ease.

Further effects to be stated below are brought forth in the case where the FIFO memory 301, which can be random-accessed and have unnecessary data items cleared at will by the central processing unit 303, is utilized as a buffer memory for the serial input circuit 304. When the CPU 303 is to execute protocol processing for received data, it can random-access the FIFO memory 301 and obtain at will the information of a control field or the like contained in the received data, thereby to perform the protocol processing. Moreover, received data which becomes unnecessary as a result of the protocol processing, or unnecessary data contained in the received data, such as source identifying data, can be easily cleared in the FIFO memory 301 as the buffer memory. Accordingly, it is not a requirement of protocol processing that all the data items stored in the FIFO memory 301 are transferred at once to a local memory or the like beforehand. Thus, the protocol processing can be made efficient, and the system can be simplified.

FIFO Memory 331

Figure 16:
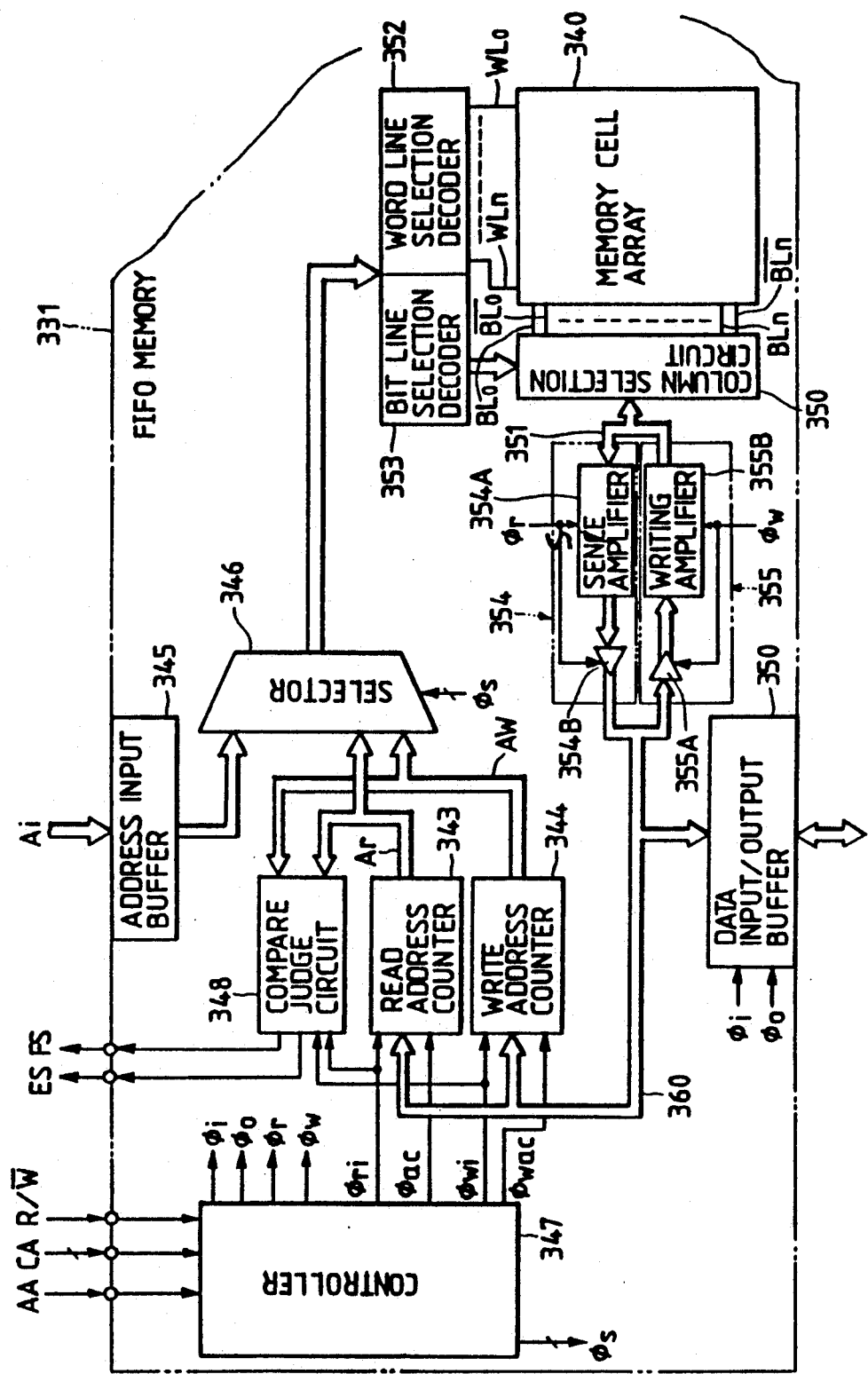
FIG. 16 is a block diagram of a FIFO memory which is still another embodiment according to the present invention.

FIG. 16 shows another FIFO memory 331 according to the present invention. Although not especially restricted, the FIFO memory 331 depicted in FIG. 16 is used as one peripheral unit which is included in a microcomputer system illustrated in FIG. 17. It is formed on a single semiconductor substrate such as silicon substrate by techniques known in the semiconductor integrated circuits industry.

Figure 17:
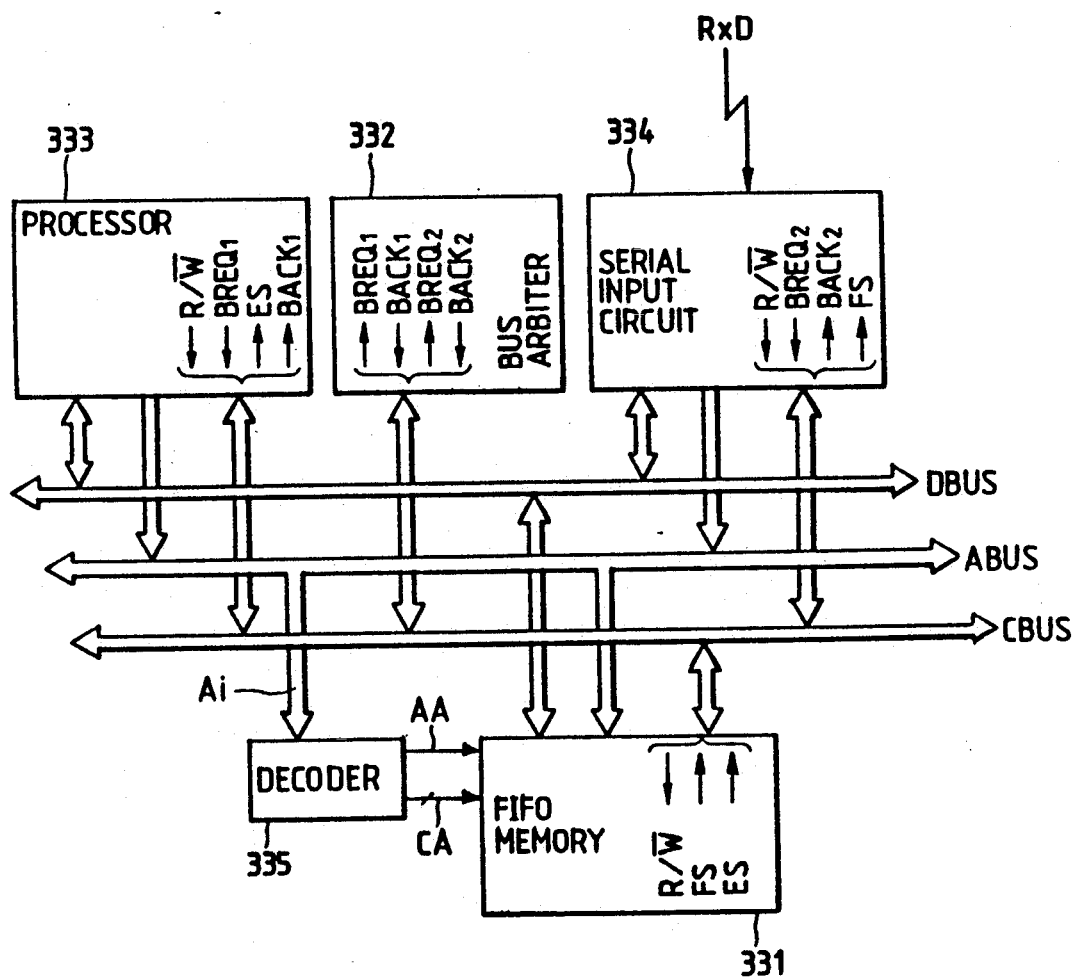
FIG. 17 is a block diagram showing a system which includes the FIFO memory illustrated in FIG. 16.

In FIG. 17, a processor 333 and a serial input circuit 334, bus master modules, and a bus arbiter 332, for arbitrating a bus mastership, are typically illustrated besides the FIFO memory 331. They are coupled to a data bus DBUS, an address bus ABUS and a control bus CBUS. The processor 333 and the serial input circuit 334 deliver respective bus request signals $BREQ_1$ and $BREQ_2$ as signals for requesting bus mastership. The bus arbiter 332, which receives the bus request signals $BREQ_1$ and $BREQ_2$, delivers bus acknowledge signals $BACK_1$ and $BACK_2$ for acknowledging the bus mastership to either the processor 333 or the serial input circuit 334.

The serial input circuit 334 synchronizes or restores reception data items $R_{xD}$ supplied in bit-serial fashion and then accepts them. It converts the accepted data items into parallel data items and then delivers the latter as an output. The FIFO memory 331 is utilized as a buffer memory which stores the data items supplied from the serial input circuit 334. Although not especially restricted, the processor 333 also performs data processing such as protocol processing for the received data items stored in the FIFO memory 331. The FIFO memory 331 is constructed of a single chip or a single pellet, and it has an interface portion which is utilized for general purposes. The interface portion is coupled to the data bus DBUS, address bus ABUS and control bus CBUS. The FIFO memory 331 receives a read/write signal R/W delivered from the processor 333 or the serial input circuit 334, through the control bus CBUS. Also, the FIFO memory 331 supplies the control bus CBUS with 1) a full signal FS for informing the exterior, particularly the serial input circuit 334, of a state in which no empty memory cell exists in this FIFO memory 331; and, 2) with an empty signal ES for informing the exterior, particularly the processor 333, of a state in which a data item to be read out no longer exists. In addition, the FIFO memory 331 receives control signals AA and CA generated in such a way that the predetermined bits of an address signal $A_i$ delivered from the processor 333 or the serial input circuit 334 are decoded by a decoder 335.

The details of the FIFO memory 331 will be described in conjunction with FIG. 16. While the FIFO memory 331 executes the input/output of data items in the first-in first-out form, it is also capable of random accesses and the clearing of unnecessary data through the processor 333.

Referring to FIG. 16, numeral 340 denotes a memory cell array in which a plurality of rewritable memory cells, for example static memory cells, are arranged in the shape of a matrix. The memory cells included in the memory cell array 340, in respective rows, have their selection terminals coupled to corresponding word lines $WL_0$-$WL_n$. The memory cells in respective columns have their data input/output terminals coupled to corresponding complementary bit lines $BL_0$, $BL_0$–$BL_n$, $BL_n$. These complementary bit lines $BL_0$, $BL_0$–$BL_n$, $BL_n$ are connected to complementary common data lines 351 through a column selection circuit 350. A memory cell included in the memory cell array 340 is addressed by a word line selection decoder 352 and a bit line selection decoder 353. More specifically, the word line selection decoder 352 decodes an address signal supplied thereto and drives a predetermined word line to a selection level. Further, the bit line selection decoder 353 decodes an address signal supplied thereto and controls the column selection circuit 350 so as to conduct a predetermined complementary pair of the complementary bit lines to the complementary common data lines 351. Although no special restriction is intended, a data item is read out of the memory cell addressed by the word line selection decoder 352 and the bit line selection decoder 353, by a read circuit 354 which includes a sense amplifier 354A and an output gate 354B. On the other hand, although no special restriction is intended, a data item is written into the addressed memory cell by a write circuit 355 which includes an input gate 355A and a write amplifier 355B.

The address signals $A_i$ for the random accesses by the processor 333 are supplied to an address input buffer 345. In order to internally generate access addresses, the FIFO memory 331 is furnished with a read address counter 343 and a write address counter 344 which are constructed of, e.g., binary counters. The write address counter 344 increments and delivers write addresses $A_w$ successively at the respective data write operations based on the first-in form. The increment operation of the write address counter 344 is conducted so that a control signal $\phi_{wi}$, which is output from a controller 347, is asserted. On the other hand, the read address counter 343 increments and delivers read addresses $A_r$ successively at the respective data read operations based on the first-out form. The increment operation of the read address counter 343 is conducted so a control signal $\phi_{ri}$, which is output from the controller 347, is asserted.

The address signal $A_i$, internally accepted by the address input buffer 345, the address signal $A_r$, delivered from the read address counter 343, and the address signal $A_w$, delivered from the write address counter 344, are subjected to selection by a selector 346. The selected signal is supplied to the word line selection decoder 352 and the bit line selection decoder 353. The selection control of the selector 346 is carried out according to a control signal $\phi_s$ having a plurality of bits which are output from the controller 347.

The values of the read address counter 343 and the write address counter 344 are held in agreement in the initial states thereof. The address signal $A_r$, delivered from the read address counter 343, and the address signal $A_w$, delivered from the write address counter 344, are supplied to a compare judge circuit 348. Thus, the agreement/disagreement of the address signals is normally monitored. Upon detecting the agreement of both the values $A_r$ and $A_w$ in the write operation of the first-in type, the compare judge circuit 348 asserts the full signal FS to its high level in order to inform the serial input circuit 334 of the state in which no new writing is possible. Upon detecting the agreement of both the values $A_r$ and $A_w$ in the read operation of the first-out type, the compare judge circuit 348 asserts the empty signal ES to its high level in order to inform the processor 333 of the state in which a data item to be read no longer exists. Although not especially restricted, the compare judge circuit 348 detects the write operation of the first-in type on the basis of the instruction of the increment of the write address counter 344 by the control signal $\phi_{wi}$. It detects the read operation of the first-out type on the basis of the instruction of the increment of the read address counter 343 by the control signal $\phi_{ri}$.

The output terminals of the output gate 354B, included in the read circuit 354, and the input terminals of the input gate 355A, included in the write circuit 355, are interfaced with the data bus DBUS through a data input/output buffer 350. The input/output control of data for the data input/output buffer 350 is performed by control signals $\phi_i$ and $\phi_o$ which are output from the controller 347 in accordance with the level of the read/write signal R/W. In addition, a read/write control for the read circuit 354 and the write circuit 355 is initiated by control signals $\phi_r$ and $\phi_w$, which are output from the controller 347 in accordance with the level of the read/write signal R/W.

The read address counter 343 and write address counter 344 possess preset functions and are coupled to the data input/output buffer 350 through an internal data bus 360. Thus, the processor 333 can read out the address signals $A_r$ and $A_w$ held in these counters. It can also rewrite the held values. The input/output gate of the read address counter 343, coupled to the data input/output buffer 350, is enabled or disabled by a control signal $\phi_{rac}$ which is output from the controller 347. Likewise, the input/output gate of the write address counter 344, coupled to the data input/output buffer 350, is enabled or disabled by a control signal $\phi_{wac}$, which is output from the controller 347.

Here, the control signal AA, delivered from the decoder 335, is regarded as a signal whose high level designates the random access to the FIFO memory 331 as based on the address signal $A_i$. When the control signal AA is asserted to the high level, the controller 347 causes the selector 346 to select and deliver the address signal $A_i$. The read or write operation in the random access is initiated by the read/write signal R/W delivered from the processor 333. In the case where the memory read operation is initiated by the read/write signal R/W, the control signals $\phi_r$ and $\phi_o$ are asserted, and the control signals $\phi_w$ and $\phi_i$ are negated. In the case where the memory write operation is initiated, the control signals $\phi_r$ and $\phi_o$ are negated, and the control signals $\phi_w$ and $\phi_i$ are asserted.

The control signal CA of 2 bits delivered from the decoder 335 is used as a control signal for initiating accesses to the read address counter 343 and write address counter 344. One predetermined bit contained in the control signal CA is regarded as a bit whose high level designates the access to the read address counter 344. The other bit is regarded as a bit whose high level designates the access to the write address counter 344. When the access to the read address counter 343 is initiated by the control signal CA, the controller 347 asserts the control signal $\phi_{rac}$ so as to enable the unshown input/output gate of the read address counter 343. On the other hand, when the access to the write address counter 344 is initiated by the control signal CA, the controller 347 asserts the control signal $\phi_{wac}$ so as to enable the unshown input/output gate of the write address counter 344. The read or write operation on this occasion is initiated by the read/write signal R/W, in accordance with whether control signals $\phi_i$ and $\phi_o$ is asserted. Thus, the input/output direction of data in the data input/output buffer 350 is controlled. Incidentally, when the read address counter 343 or write address counter 344 is to be accessed, the control signals $\phi_r$ and $\phi_w$ are both negated.

When the control signal AA is negated to its low level, the read operation is initiated by the read/write signal R/W. The FIFO memory 331 is brought into a read operation mode based on the first-out form conforming to the output address signal $A_r$ of the read address counter 343. The control signal $\phi_{ri}$ is thus asserted. The read address counter 343 is incremented. The address signal $A_r$ delivered from the incremented read address counter 343 is supplied to the word line selection decoder 352 and the bit line selection decoder 353 through the selector 346.

When the control signal AA is negated to the low level, the write operation is initiated by the read/write operation R/W. The FIFO memory 331 is brought into a write operation mode based on the first-in form conforming to the output address signal $A_w$ of the write address counter 344. The control signal $\phi_{wi}$ is thus asserted. The write address counter 344 is incremented. The address signal $A_w$, delivered from the incremented write address counter 344, is supplied to the word line selection decoder 352 and the bit line selection decoder 353 through the selector 346.

The FIFO memory 331 of this embodiment is accessible from both the processor 333 and the serial input circuit 334 through the common interface portion. Since, however, the bus mastership is acknowledged to either of the processor 333 and the serial input circuit 334 by the bus arbiter 332, the conflict of the accesses from both the processor 333 and the serial input circuit 334 to the FIFO memory 331 is avoided by the bus mastership arbitration of the bus arbiter 332.

Next, the operation of the FIFO memory 331 will be described.

The serial input circuit 334 asserts the bus request signal BREQ2 when the full signal FS is not asserted. Subject to the acknowledgement of the bus mastership responsive to the request, the serial input circuit 334 delivers the address signal $A_i$, capable of setting the control signal AA to a low level. It sets the read/write signal R/W to a low level thereby to instruct the FIFO memory 331 to perform the write operation based on the first-in form. Thereafter, it delivers the received data items $D_{rx}$ to the data bus DBUS. Thus, the FIFO memory 331 stores the reception data items $D_{rx}$ in the memory cell array 340 in regular sequence while incrementing the write address counter 344.

The processor 333 asserts the bus request signal BREQ1 when the empty signal ES is not asserted. Subject to the acknowledgement of the bus mastership responsive to the request, the processor 333 delivers the address signal $A_i$, capable of setting the control signal AA to a low level. It sets the read/write signal R/W to a high level thereby to instruct the FIFO memory 331 to perform the read operation based on the first-out form. Thus, the FIFO memory 331 reads out the received data items stored in the memory cell array 340 in regular sequence while incrementing the read address counter 343.

Here, in a case where unnecessary data items have arisen among the received data items stored in the memory cell array 340, due to an error or the like in any system operation, the operation of clearing the unnecessary data items proceeds in the same manner as in the case of the FIFO memory 301. Let's consider the case, illustrated in FIG. 15A, where the data items of areas ED1 and ED2 in the address space of the memory cell array 340 have become unnecessary when the read address counter 343 and write address counter 344 indicate certain values $A_r$ and $A_w$, respectively. In this case, the processor 333 rewrites the value of the read address counter 343 to a value $A_r'$ and that of the write address counter 344 to a value $A_w'$, as illustrated in FIG. 15B. When the values of the read address counter 343 and write address counter 344 have been rewritten in this manner, the received data items $D_{rx}$, which are thereafter delivered from the serial input circuit 334, are written successively from the address of the value $A_w'$ indicated by the write address counter 344. The unnecessary data remaining in the area ED2 is not utilized. Further, in a case where the processor 333 thereafter loads in the first-out form the received data items stored in the memory cell array 340, the data items are read out successively from the address of the value $A_r'$ appointed by the read counter 343. The data remaining in the area ED1 is not utilized. Accordingly, the substantial clearing of the unnecessary data items can be easily carried out merely by processing in which the processor 333 rewrites the values of the read address counter 343 and write address counter 344. The process in which all the unnecessary data items are read out in sequence so as to update the value of the read address counter 343 is no longer required.

While clearing, in a case where the processor 333 needs to know the states of the read address counter 343 and write address counter 344 in rewriting the values of these counters, the read address counter 343 and write address counter 344 are accessed in order to read the values thereof. It calculates the rewritten values $A_r'$, $A_w'$ on the basis of the respective loaded values $A_r$, $A_w$.

When it becomes necessary in any system operation to check data stored in the FIFO memory 331, the processor 333 random-accesses the FIFO memory 331 and loads the required data by the use of the address signal $A_i$. In the read operation on this occasion, the control signal $\phi_{ri}$ is not asserted. So, the value of the read address counter 343 is maintained as is. In the random access, in a case where the processor 333 requires address information serving as the reference of the physical address space of the FIFO memory 331 or the necessary address to-be-accessed, it can random-access the read address counter 343 or write address counter 344 and load the value thereof.

Like the FIFO memory 301, FIFO memory 331 can be random-accessed even when the sequences of reading and writing data items are prescribed by the values of the built-in address counters 343 and 344. Also, the FIFO memory 331 can execute the substantial clearing of data with ease. When the processor 333 is to execute protocol processing for received data, it is not required for protocol processing that all the data items stored in the FIFO memory 331 are transferred at once to a local memory or the like beforehand. Thus, the protocol processing can be made efficient.

Although, in the above, the invention made by the inventor has been concretely described in conjunction with embodiments, the present invention is not restricted thereto. It can be altered within a scope not departing from the purport thereof.

By way of example, host devices such as CPU 9 may be built in the communication control unit 1 which is constructed as a single LSI. In addition, each of the receiving circuit 2 and the transmitting circuit 3 can be put into a multichannel structure. FIFO memories can be disposed for respective communication channels in this case. The bit width of the unit storage area is not restricted to 8 bits. Further, the relation between the number of bits read in parallel fashion and the number of bits written in parallel fashion in the FIFO memories 6, 7 is not restricted to the relation of double in the foregoing embodiments. It can be changed into any other relation of a whole number multiple of at least 2.

In addition, the function modules which access the FIFO memory 301 or 331 have been explained as the central processing unit or the processor, and the serial input circuit. However, a direct memory access controller, a parallel input circuit, etc. may be included. Further, control signals for determining the operation modes of the FIFO memory 301 or 331 are not restricted to the control signals AA and CA described in the embodiment. They can be properly altered. Generation of control signals can also be altered. Further, the clearing in the FIFO memory 301 or 331 is not restricted to the contents explained with reference to FIGS. 15A and 15B. By way of example, in a case where the unnecessary data exists in only the area ED1 in FIG. 15A, only the value of the read address counter may be rewritten. Likewise, in a case where the unnecessary data exists in only the area ED2 in FIG. 15A, only the value of the write address counter may be rewritten.

In the foregoing, the invention made by the inventor has been chiefly described as to the cases of applications to a communication control unit and a buffer memory for reception data forming the background fields of utilization. However, the present invention is not restricted to them, but it can also be extensively applied to a floppy disk controller as well as a hard disk controller, a FIFO memory itself constructed of a single LSI, and so forth.

What is claimed is:

1. A semiconductor memory device having a bit cell array in which a plurality of bit cells are arranged in a matrix shape, in first-in first-out fashion, comprising:
   write means for selecting a write position where data is to be written into said bit cell array;
   read means for selecting one of a single read position and a plurality of read positions in the bit cell array, the selected one being one from which data written in said bit cell array can be read;
   input signal lines coupled to said bit cells;
   output signal lines coupled to said bit cells; and,
   read control means for outputting first and second signals, wherein the first signal indicates a read operation for a single data item from the single read position and the second signal indicates a read operation for a plurality of data items from the plurality of read positions, wherein the single data item is output from said bit cell array in parallel fashion through said output signal lines when the read means receives the first signal, and wherein the plurality of data items are output from said bit cell array in parallel fashion through said output signal lines when the read means receives the second signal.

2. The semiconductor memory device according to claim 1, wherein the read control means outputs one of the first and second signals in response to a control signal from a CPU.

3. A communication controlling LSI having a bit cell array in which a plurality of bit cells are arranged in a matrix shape, in first-in first-out fashion, the communication controlling LSI comprising:
   write means for selecting a write position where data is to be written into said bit cell array;
   read means for selecting one of a single read position and a plurality of read positions, the selected one being one from which data written in said bit cell array can be read;
   input signal lines coupled to said bit cells;
   output signal lines coupled to said bit cells; and,
   read control means for outputting first and second signals, wherein the first signal indicates a read operation for a single data item from the single read position and the second signal indicates a read operation for a plurality of data items from the plurality of read positions, wherein the single data item is outputted from said bit cell array in parallel fashion through said output signal lines when the read means receives the first signal, and wherein the plurality of data items are outputted from said bit cell array in parallel fashion through said output signal lines when the read means receives the second signal;
   comparison means for comparing a value of said write means and a value of said read means to generate a compared result;
   arithmetic means for calculating a number of stored data items in said bit cell array by a use of the value of said write means, the value of said read means and a total number of said unit storage areas, in accordance with the compared result of said comparison means;
   a first rewritable register for storing start data which corresponds to a number of available unit storage areas in the bit cell array when a data transfer operation from a memory to said bit cell array is requested;
   a second rewritable register for storing stop data which corresponds to the number of available unit storage areas in the bit cell array when a stop of said data transfer operation from said memory to said bit cell array is requested; and,
   timing signal generating means coupled to said first and second rewritable registers and to said arithmetic means, for comparing the start data and stop data stored in said first and second rewritable registers with the number calculated by said arithmetic means, and for selectively generating a timing signal in accordance with the comparing, wherein said data transfer operation from said memory to said bit cell array is controlled by said timing signal.

4. The communication controlling LSI according to claim 3, wherein:
   each of said write means and said read means includes a status indicator which is inverted each time respective count values of each of said read and write means are returned to initial values; and,
   said comparison means discriminates a magnitude relation between the count values of each of said read and write means on the basis of an agreement/disagreement condition of the status indicators of each of said read and write means.

5. The communication controlling LSI according to claim 4, wherein said arithmetic means includes:
   first means for acquiring the number of stored data items under the agreement condition of the status indicators compared by said comparison means, in such a way that the value of said read means is subtracted from the value of said write means; and, means for acquiring the number of stored data items under the disagreement condition of the compared status indicators, in such a way that the value of said read means is subtracted from a value obtained by adding the total number of said unit storage areas to the value of said write means.

6. The communication controlling LSI according to claim 5, wherein said timing signal is a "transfer ready" signal, said start data is data for determining an assert condition of said "transfer ready" signal for instructing said data transfer operation, said stop data is data for determining a negate condition of the transfer ready signal, and wherein said timing signal generating means includes means for generating the transfer ready signal so as to determine an assert timing thereof on a basis of a result of comparison between the assert condition set in said first register and the number of stored data items calculated by the arithmetic means, and to determine a negate timing of the transfer ready signal once assert, on a basis of a result of comparison between the negate condition of the transfer ready signal set in said second register and the number of stored data items calculated by said arithmetic means.

7. A communication system comprising a CPU, a direct memory access controller (DMAC), a communication controlling LSI including a bit cell array which has a plurality of unit storage areas and which stores data items to be transmitted in series, in first-in first-out fashion, said communication controlling LSI including:

write means for selecting a write position where data is to be written into said bit cell array;

read means for selecting one of a single read position and a plurality of read positions, the selected one being one from which data written in said bit cell array can be read;

input signal lines coupled to said bit cells;

output signal lines coupled to said bit cells; and, read control means for outputting a first signal in response to a first control signal from the CPU and a second signal in response to a second control signal from the CPU, wherein the first signal indicates a read operation for a single data item from the single read position and the second signal indicates a read operation for a plurality of data items from the plurality of read positions, wherein the single data item is output from said bit cell array in parallel fashion through said output signal lines when the read means receives the first signal, and wherein the plurality of data items are output from said bit cell array in parallel fashion through said output signal lines when the read means receives the second signal;

comparison means for comparing a selected value of said write means and a selected value of said read means to generate a compared result;

arithmetic means for calculating a number of stored data items in said bit cell array by a use of the selected value of said write means, the selected value of said read means and a total number of said unit storage areas, in accordance with the compared result of said comparison means;

a first rewritable register for storing start data which corresponds to a number of available unit storage areas in the bit cell array when a data transfer operation from a memory to said bit cell array is requested;

a second rewritable register for storing stop data which corresponds to the number of available unit storage areas in the bit cell array when a stop of said data transfer operation from said memory to said bit cell array is requested; and, timing signal generating means coupled to said first and second rewritable registers and to said arithmetic means, for comparing the start data and stop data stored in said first and second rewritable registers with the number calculated by said arithmetic means, and for selectively outputting a timing signal in accordance with the comparing to said DMAC, wherein said DMAC controls said data transfer operation from said memory to said bit cell array by said timing signal.

* * * * *